(12) United States Patent
Morimoto et al.

(10) Patent No.: US 9,062,787 B2
(45) Date of Patent: Jun. 23, 2015

(54) VALVE BLOCK, AND VALVE BLOCK UNIT

(75) Inventors: Hiroyuki Morimoto, Tokyo (JP); Koji Yamashita, Tokyo (JP); Katsuhiko Hayashida, Tokyo (JP); Hiroto Nakao, Tokyo (JP); Yuji Motomura, Tokyo (JP); Shinichi Wakamoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 543 days.

(21) Appl. No.: 13/258,163

(22) PCT Filed: Apr. 17, 2009

(86) PCT No.: PCT/JP2009/057743
§ 371 (c)(1),
(2), (4) Date: Sep. 21, 2011

(87) PCT Pub. No.: WO2010/119560
PCT Pub. Date: Oct. 21, 2010

(65) Prior Publication Data
US 2012/0006436 A1    Jan. 12, 2012

(51) Int. Cl.
*F16K 11/085* (2006.01)
*F16K 27/00* (2006.01)
(Continued)

(52) U.S. Cl.
CPC .............. *F16K 27/003* (2013.01); *F16K 11/085* (2013.01); *F16K 11/22* (2013.01);
(Continued)

(58) Field of Classification Search
CPC ........................... F16K 27/003; F16K 11/0856
USPC .............. 137/597, 599.08, 605–607, 625.41, 137/625.46–625.47, 884, 887; 251/310; 165/50, 218–219
See application file for complete search history.

(56) References Cited

U.S. PATENT DOCUMENTS 1,313,140 A * 8/1919 Vincent .................... 137/625.42
3,058,488 A * 10/1962 Hirst et al. .................... 137/596
(Continued)

FOREIGN PATENT DOCUMENTS

JP     2-118372 A      5/1990
JP     6-313488 A      11/1994
(Continued)

OTHER PUBLICATIONS

Second Office Action issued on Jul. 25, 2013, by the Chinese Patent Office in corresponding Chinese Patent Application No. 200980158730.1, and an English Translation of the Office Action. (7 pages).

(Continued)

*Primary Examiner* — John Fox
(74) *Attorney, Agent, or Firm* — Buchanan Ingersoll & Rooney PC

(57) ABSTRACT

A valve block and a valve block unit which allow simplification and miniaturization of a pipe arrangement. The valve block includes at least one flow switching valve including a valve body, the valve selectively switching between conductions of a fluid (heat medium), a first pipe (heating outward-flow main pipe) and a second pipe (cooling outward-flow main pipe), switched by the flow switching valve, allowing the fluid to be conveyed therethrough, and a third pipe (first branch pipe) that selectively communicates with the first pipe or the second pipe, the flow switching valve, the first pipe, the second pipe, and the third pipe being connected to each other.

7 Claims, 20 Drawing Sheets

(51) Int. Cl.
*F16K 11/22* (2006.01)
*F25B 41/00* (2006.01)
*F25B 13/00* (2006.01)
*F25B 25/00* (2006.01)

(52) U.S. Cl.
CPC .............. *F25B 13/00* (2013.01); *F25B 25/005* (2013.01); *F25B 41/003* (2013.01); *F25B 2313/0272* (2013.01); *F25B 2313/02741* (2013.01)

(56) References Cited

U.S. PATENT DOCUMENTS

| | | | | |
|---|---|---|---|---|
| 3,552,294 | A | * | 1/1971 | Goldberg ...................... 454/333 |
| 4,293,004 | A | * | 10/1981 | Lowe ............................. 137/884 |
| 4,312,425 | A | * | 1/1982 | Snow et al. .................... 184/7.4 |
| 4,377,183 | A | * | 3/1983 | Johansson et al. ............ 137/606 |
| 5,165,596 | A | * | 11/1992 | Le Mer ......................... 237/8 R |
| 5,313,985 | A | * | 5/1994 | Donner ...................... 137/15.18 |
| 6,036,107 | A | * | 3/2000 | Aspen et al. .................. 239/170 |
| 7,198,063 | B2 | * | 4/2007 | Abe .............................. 137/606 |
| 7,418,978 | B2 | * | 9/2008 | Chao et al. .................... 137/884 |

FOREIGN PATENT DOCUMENTS

| | | |
|---|---|---|
| JP | 7-012242 A | 1/1995 |
| JP | 8-128560 A | 5/1996 |
| JP | 2003-343936 A | 12/2003 |
| JP | 2008-298179 A | 12/2008 |

OTHER PUBLICATIONS

International Search Report (PCT/ISA/210) issued on Jul. 14, 2009, by Japanese Patent Office as the International Searching Authority for International Application No. PCT/JP2009/057743.

Japanese Office Action (Notice of Reasons for Rejection) dated Feb. 5, 2013, issued in corresponding Japanese Patent Application No. 2011-509157, and English language translation of Office Action. (6 pages).

Chinese Office Action (Reason for Refusal) dated Dec. 5, 2012, issued in corresponding Chinese Patent Application No. 2009801587301 and English translation. (11 pages).

Office Action issued on Jun. 18, 2014, by the Chinese Patent Office in corresponding Chinese Patent Application No. 200980158730.1, and an English Translation of the Office Action. (9 pages).

Office Action issued on Dec. 25, 2014, by the Chinese Patent Office in corresponding Chinese Patent Application No. 200980158730.1 (3 pages).

* cited by examiner

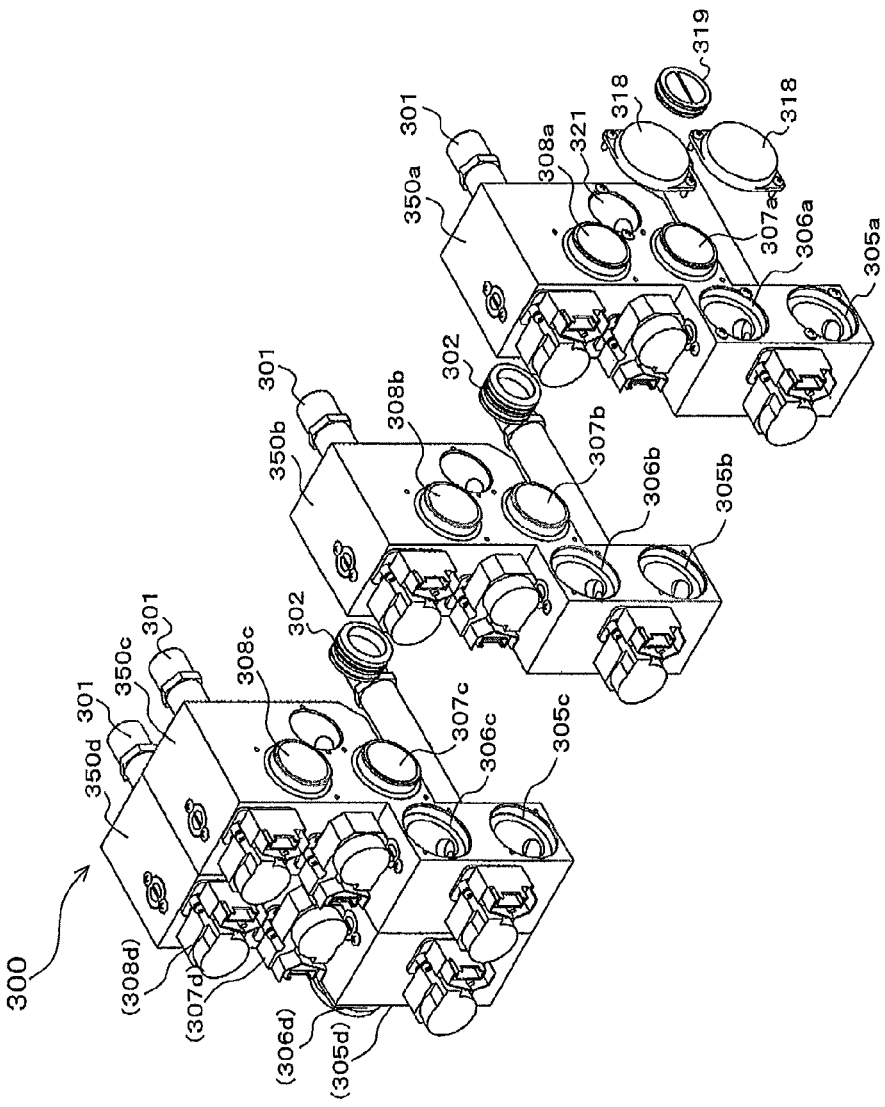

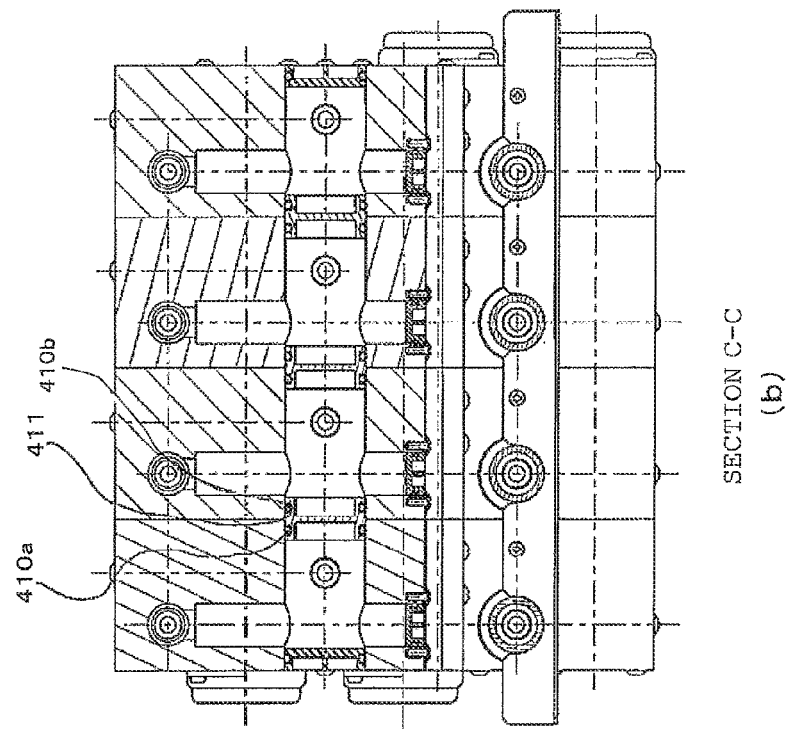
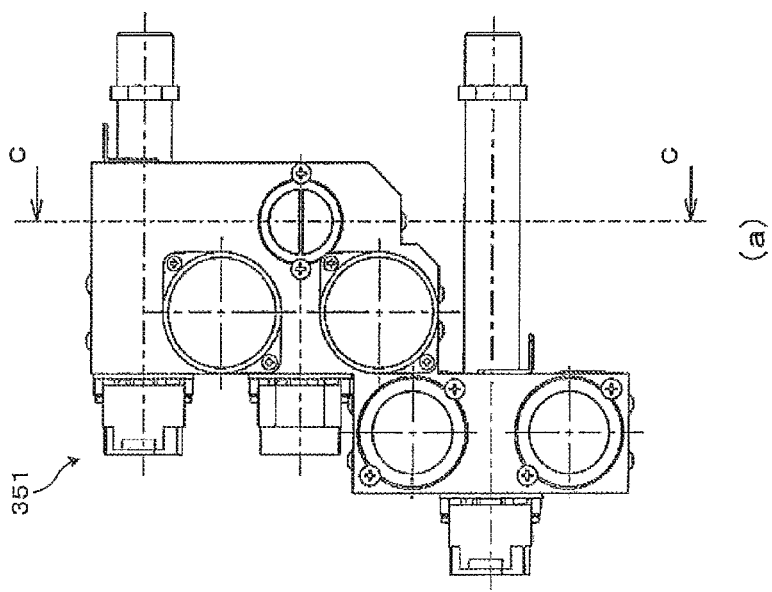
FIG. 16

VALVE BLOCK, AND VALVE BLOCK UNIT

TECHNICAL FIELD

The present invention relates to a valve block including a plurality of pipes and at least one flow rate control device, a valve block unit including a plurality of the valve blocks coupled together, and a method of inspecting the valve block unit, and in particular, relates to a valve block and a valve block unit which allow simplification and miniaturization of a pipe arrangement.

BACKGROUND ART

An example of an existing air conditioner is a building type multi-split air conditioner to which an air conditioning apparatus is applied, the air conditioning apparatus being configured to perform a cooling operation or heating operation while delivering cooling energy or heating energy to an air conditioning target area, such as a room, by circulating a refrigerant between an outdoor unit, serving as a heat source unit, disposed outside the room and an indoor unit disposed in the room (refer to, for example, Patent Literature 1). As regards the refrigerant used in such an air conditioning apparatus, for example, an HFC-based refrigerant has been usually used. Further, a natural refrigerant, such as carbon dioxide ($CO_2$), has recently been used.

In addition, there exists an air conditioning apparatus with another configuration, typified by a chiller system. In this air conditioning apparatus, cooling energy or heating energy is generated in a heat source unit disposed outside a room, the cooling energy or heating energy is transferred to a heat medium, such as water or antifreeze solution, in a heat exchanger disposed in an outdoor unit, and this is delivered to a fan coil unit, a panel heater, or the like, serving as an indoor unit disposed in an air conditioning target area to perform the cooling operation or heating operation (refer to, for example, Patent Literature 2). Further, there exists a waste heat recovery chiller in which four water pipes are connected to a heat source unit to supply cooling energy and heating energy.

CITATION LIST

Patent Literature

Patent Literature 1: Japanese Unexamined Patent Application Publication No. 2-118372 (p. 3, FIG. 1)
Patent Literature 2: Japanese Unexamined Patent Application Publication No. 2003-343936 (p. 5, FIG. 1)

SUMMARY OF INVENTION

Technical Problem

In a related-art air conditioning apparatus, since a high-pressure refrigerant is delivered to an indoor unit, the amount of refrigerant filled is very large. If the refrigerant leaks from a refrigerant circuit, the global environment is adversely affected, e.g., global warming is accelerated. Particularly, R410A has a high global warming potential of 1970. In the use of such a refrigerant, a reduction in the amount of refrigerant filled is of great importance in terms of protection of the global environment. Further, if a refrigerant leaks into a living space, the chemical properties of the refrigerant may adversely affect a human body. Therefore, countermeasures are needed, for example, ventilation is performed often more than necessary and a leak sensor is attached. This results in an increase in cost and an increase in power consumption.

The above-described problems can be solved by the chiller system disclosed in Patent Literature 2. However, since the heat exchange between the refrigerant and water is performed in the outdoor unit and water is delivered to the indoor unit, power necessary to deliver the water is very large, thus increasing energy consumption. Further, to supply both of cooling and heating energy by water or the like, the number of pipes connected has to be increased. Disadvantageously, the installation requires much time, effort, and money. If the apparatus previously accommodates connecting pipes, valves, and heat exchangers in order to simplify piping on site, the apparatus receiving the pipes and the valves is very large, thus causing an increase in cost and a reduction in productivity.

The present invention has been made to solve the above-described problems. An object of the present invention is to provide a valve block and a valve block unit which allow simplification and miniaturization of a pipe arrangement, and a method of inspecting the valve block unit.

Solution to Problem

A valve block according to the present invention includes at least one flow direction switching means including a valve body that selectively switches between conductions of a fluid, flow rate control means capable of adjusting a flow rate of the fluid, a first pipe and a second pipe, switched by the flow direction switching means, allowing the fluid to be conveyed therethrough, and a third pipe that selectively communicates with the first pipe or the second pipe, the flow direction switching means, flow rate control means, the first pipe, the second pipe, and the third pipe being connected to each other.

A valve block unit according to the present invention includes the above-described valve blocks, wherein the first pipes and the second pipes of the valve blocks are coupled together, respectively.

Advantageous Effects of Invention

The valve block and the valve block unit according to the present invention can omit pipes connecting components (e.g., a heat medium flow direction switching device, a heat medium flow rate control device). Accordingly, the pipe arrangement can be simplified. Further, since the valve block according to the present invention allows the simplification of the pipe arrangement, the valve block can be miniaturized, thus increasing the efficiency of production. Moreover, since the valve block according to the present invention can be miniaturized, it contributes to making a unit (e.g., a relay unit or the like) including this valve block compact.

BRIEF DESCRIPTION OF DRAWINGS

FIG. 10 is an explanatory diagram explaining coupling of the valve blocks.

FIG. 16 is an explanatory diagram explaining coupling of the valve blocks.

DESCRIPTION OF EMBODIMENTS

Embodiments of the present invention will be described below.

Embodiment 1

Figure 1:
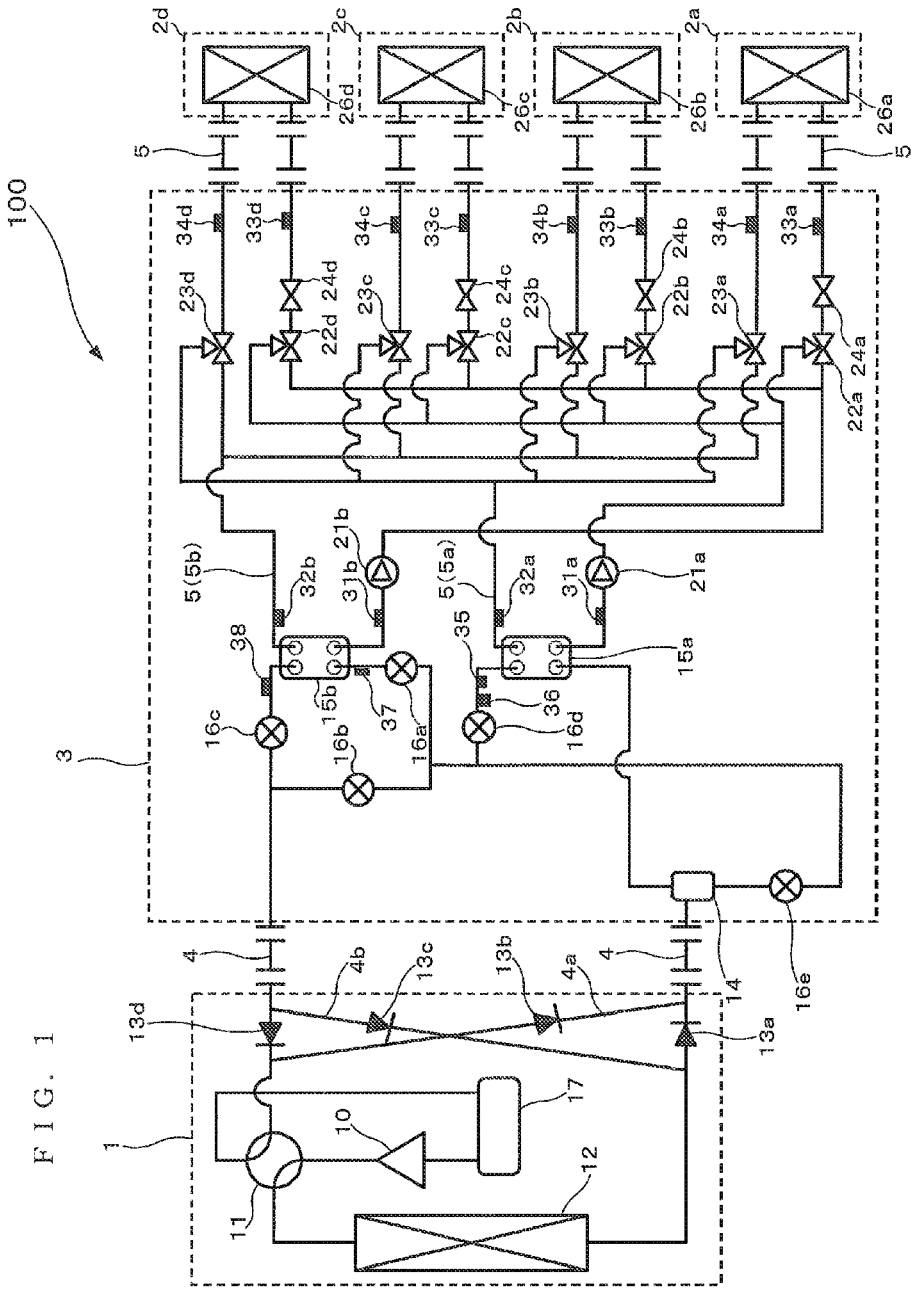
FIG. 1 is a schematic circuit diagram illustrating the configuration of an air conditioning apparatus including a valve block unit according to Embodiment 1.
Figure 3:
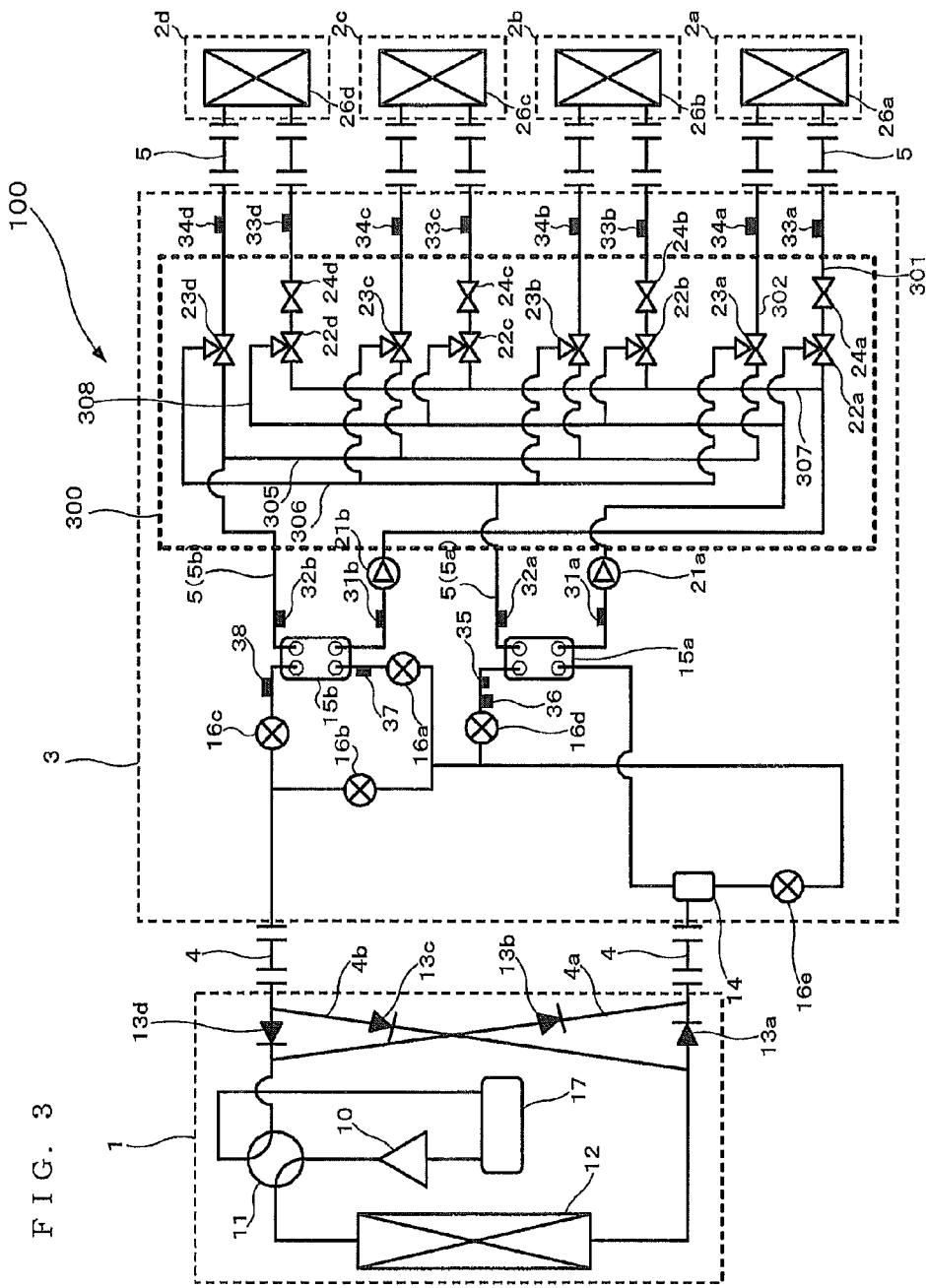
FIG. 3 is a refrigerant circuit diagram illustrating the schematic configuration of the valve block unit in the air conditioning apparatus.

FIG. 1 is a schematic circuit diagram illustrating the configuration of an air conditioning apparatus 100 including a valve block unit 300 according to Embodiment 1 of the present invention. The detailed configuration of the air conditioning apparatus 100 will be described with reference to FIG. 1. Referring to FIG. 1, an outdoor unit 1 is connected to a relay unit 3 through a first heat medium heat exchanger 15a and a second heat medium heat exchanger 15b. The relay unit 3 is also connected to each indoor unit 2 through the first heat medium heat exchanger 15a and the second heat medium heat exchanger 15b. The configurations and functions of component devices included in the air conditioning apparatus 100 will be described below. The valve block unit 300 is shown in FIG. 3.

[Outdoor Unit 1]

The outdoor unit 1 accommodates a compressor 10, a four-way valve 11, serving as a refrigerant flow direction switching device, a heat source side heat exchanger 12, and an accumulator 17 which are connected in series by a refrigerant pipe 4. In addition, the outdoor unit 1 includes a first connecting pipe 4a, a second connecting pipe 4b, a check valve 13a, check valve 13b, a check valve 13c, and a check valve 13d. The arrangement of the first connecting pipe 4a, the second connecting pipe 4b, the check valve 13a, the check valve 13b, the check valve 13c, and the check valve 13d allows the flow of a refrigerant on the heat source side flowing into the relay unit 3 to be in one direction irrespective of an operation required by an indoor unit 2.

The compressor 10 is configured to suck the refrigerant on the heat source side and compresses the heat-source-side refrigerant to a high-temperature high-pressure state and may be, for example, a capacity-controllable inverter compressor. The four-way valve 11 is configured to switch between the flow of the heat-source-side refrigerant in a heating operation and the flow of the heat-source-side refrigerant in a cooling operation. The heat source side heat exchanger 12 is configured to function as an evaporator in the heating operation, function as a condenser in the cooling operation, perform heat exchange between air supplied from a blower, such as a fan, (not illustrated) and the heat-source-side refrigerant, and evaporate the heat-source-side refrigerant to a gas or condense it to a liquid. The accumulator 17, provided for the suction side of the compressor 10, is configured to store excess refrigerant.

The check valve 13d is provided for the refrigerant pipe 4 between the relay unit 3 and the four-way valve 11 and is configured to allow the heat-source-side refrigerant to flow only in a predetermined direction (the direction from the relay unit 3 to the outdoor unit 1). The check valve 13a is provided for the refrigerant pipe 4 between the heat source side heat exchanger 12 and the relay unit 3 and is configured to allow the heat-source-side refrigerant to flow only in a predetermined direction (the direction from the outdoor unit 1 to the relay unit 3). The check valve 13b is provided for the first connecting pipe 4a and is configured to allow the heat-source-side refrigerant to flow only in a direction from the downstream side of the check valve 13d to the downstream side of the check valve 13a. The check valve 13c is provided for the second connecting pipe 4b and is configured to allow the heat-source-side refrigerant to flow only in a direction from the upstream side of the check valve 13d to the upstream am side of the check valve 13a.

The first connecting pipe 4a is configured to connect the refrigerant pipe 4 on the downstream side of the check valve 13d to the refrigerant pipe 4 on the downstream side of the check valve 13a in the outdoor unit 1. The second connecting pipe 4b is configured to connect the refrigerant pipe 4 on the upstream side of the check valve 13d to the refrigerant pipe 4 on the upstream side of the check valve 13a in the outdoor unit 1. Note that FIG. 1 illustrates a case where the first connecting pipe 4a, the second connecting pipe 4b, the check valve 13a, the check valve 13b, the check valve 13c, and the check valve 13d are arranged. The arrangement is not limited to this case. It is not necessarily necessary to provide these components.

[Indoor Units 2]

The indoor units 2 each include a use side heat exchanger 26. This use side heat exchanger 26 is connected to a heat medium flow rate control device 24 and a heat medium flow direction switching device 23 in the relay unit 3 through pipes 5. This use side heat exchanger 26 is configured to perform heat exchange between air supplied from a blower, such as a fan, (not illustrated) and a heat medium to produce heated air or cooled air to be supplied to an air conditioning target area.

FIG. 1 illustrates a case where four indoor units 2 are connected to the relay unit 3. An indoor unit 2a, an indoor unit 2b, an indoor unit 2c, and an indoor unit 2d are illustrated in that order from the bottom of the drawing sheet. In addition, the use side heat exchangers 26 are illustrated as a use side heat exchanger 26a, a use side heat exchanger 26b, a use side heat exchanger 26c, and a use side heat exchanger 26d in that order from the bottom of the drawing sheet so as to correspond to the indoor units 2a to 2d, respectively. Incidentally, the number of indoor units 2 connected is not limited to four as illustrated in FIG. 1.

[Relay Unit 3]

The relay unit 3 includes a liquid separator 14, a expansion device 16e, two heat medium heat exchangers 15 (the first heat medium heat exchanger 15a, the second heat medium heat exchanger 15b), four expansion devices 16, two heat medium delivery devices 21, four heat medium flow direction switching devices 22, four heat medium flow direction switching devices 23, and four heat medium flow rate control devices 24.

The liquid separator 14 is connected to one refrigerant pipe 4 connecting to the outdoor unit 1 and two refrigerant pipes 4 respectively connecting to the first heat medium heat exchanger 15a and the second heat medium heat exchanger 15b and is configured to separate the heat-source-side refrigerant supplied from the outdoor unit 1 into a vapor refrigerant and a liquid refrigerant. The expansion device 16e is disposed between the liquid separator 14 and the refrigerant pipe 4 which connects the expansion device 16a and the expansion device 16b and functions as a pressure reducing valve or an expansion device and is configured to reduce the pressure of the heat-source-side refrigerant to expand it. The expansion device 16e may include a component having a variably controllable opening, for example, an electronic expansion valve.

The two heat medium heat exchangers 15 (the first heat medium heat exchanger 15a and the second heat medium heat exchanger 15b) each function as a condenser or an evaporator and are configured to perform heat exchange between the heat-source-side refrigerant and the heat medium to supply cooling energy or heating energy produced by the outdoor unit 1 to the indoor units 2. With respect to the flow of the heat-source-side refrigerant, the first heat medium heat exchanger 15a is disposed between the liquid separator 14 and the expansion device 16d. With respect to the flow of the heat-source-side refrigerant, the second heat medium heat exchanger 15b is disposed between the expansion device 16a and the expansion device 16c.

The four expansion devices 16 (expansion devices 16a to 16d) each function as a pressure reducing valve or an expansion valve and are each configured to reduce the pressure of the heat-source-side refrigerant to expand it. The expansion device 16a is disposed between the expansion device 16e and the second heat medium heat exchanger 15b. The expansion device 16b is disposed in parallel to the expansion device 16a. The expansion device 16c is disposed between the second heat medium heat exchanger 15b and the outdoor unit 1. The expansion device 16d is disposed between the first heat medium heat exchanger 15a and each of the expansion device 16a and the expansion device 16b. The four expansion devices 16 may include a component having a variably controllable opening, e.g., an electronic expansion valve.

The two heat medium delivery devices 21 (a first heat medium delivery device 21a and a second heat medium delivery device 21b) each include, for example, a pump and are each configured to pressurize the heat medium flowing through the pipe 5 to circulate it. The first heat medium delivery device 21a is provided for the pipe 5 between the first heat medium heat exchanger 15a and each of the heat medium flow direction switching devices 22. The second heat medium delivery device 21b is provided for the pipe 5 between the second heat medium heat exchanger 15b and each of the heat medium flow direction switching devices 22. Incidentally, the kind of the first heat medium delivery device 21a and the second heat medium delivery device 21b is not especially limited and may include, for example, a capacity-controllable pump.

The four heat medium flow direction switching devices 22 (heat medium flow direction switching devices 22a to 22d) each include a three-way valve and are each configured to switch between flow paths of the heat medium. The heat medium flow direction switching devices 22 whose number (four in this case) corresponds to the number of indoor units 2 installed are arranged. Each heat medium flow direction switching device 22 is disposed on the side of an inlet of a heat medium flow path of the use side heat exchanger 26 such that one of the three ways is connected to the first heat medium heat exchanger 15a, another one of the three ways is connected to the second heat medium heat exchanger 15b, and the other one of the three way is connected to the heat medium flow rate control device 24. Incidentally, the heat medium flow direction switching device 22a, the heat medium flow direction switching device 22b, the heat medium flow direction switching device 22c, and the heat medium flow direction switching device 22d are illustrated in that order from the bottom of the drawing sheet so as to correspond to the indoor units 2.

The four heat medium flow direction switching devices 23 (heat medium flow direction switching devices 23a to 23d) each include a three-way valve and are each configured to switch between heat medium flow paths. The heat medium flow direction switching devices 23 whose number (four in this case) corresponds to the number of indoor units 2 installed are arranged. Each heat medium flow direction switching device 23 is disposed on the side of an outlet of the heat medium flow path of the use side heat exchanger 26 such that one of the three ways is connected to the first heat medium heat exchanger 15a, another one of the three ways is connected to the second heat medium heat exchanger 15b, and the other one of the three ways is connected to the use side heat exchanger 26. Incidentally, the heat medium flow direction switching device 23a, the heat medium flow direction switching device 23b, the heat medium flow direction switching device 23c, and the heat medium flow direction switching device 23d are illustrated in that order from the bottom of the drawing sheet so as to correspond to the indoor units 2.

The four heat medium flow rate control devices 24 (heat medium flow rate control devices 24a to 24d) each include a two-way valve and are each configured to switch between heat medium flow paths. The heat medium flow rate control devices 24 whose number (four in this case) corresponds to the number of indoor units 2 installed are arranged. Each heat medium flow rate control device 24 is disposed on the side of the inlet of the heat medium flow path of the use side heat exchanger 26 such that one way is connected to the use side heat exchanger 26 and the other way is connected to the heat medium flow direction switching device 22. Incidentally, the heat medium flow rate control device 24a, the heat medium flow rate control device 24b, the heat medium flow rate control device 24c, and the heat medium flow rate control device 24d are illustrated in that order from the bottom of the drawing sheet so as to correspond to the indoor units 2.

In addition, the relay unit 3 includes two first heat medium temperature detecting means 31, two second heat medium temperature detecting means 32, four third heat medium temperature detecting means 33, four fourth heat medium temperature detecting means 34, first refrigerant temperature detecting means 35, refrigerant pressure detecting means 36, second refrigerant temperature detecting means 37, and third refrigerant temperature detecting means 38. Information detected by these detecting means is transmitted to a controller (not illustrated) that controls an operation of the air conditioning apparatus 100 and is used to control, for example, the driving frequency of the compressor 10 or the heat medium delivery devices 21 and switching between the flow paths of the heat medium flowing through the pipes 5.

The two first heat medium temperature detecting means 31 (first heat medium temperature detecting means 31a and first heat medium temperature detecting means 31b) are each configured to detect a temperature of the heat medium flowing out of the heat medium heat exchanger 15, namely, the temperature of the heat medium at the outlet of the heat medium heat exchanger 15 and may include, for example, a thermistor. The first heat medium temperature detecting means 31a is provided for the pipe 5 on the inlet side of the first heat medium delivery device 21a. The first heat medium temperature detecting means 31b is provided for the pipe 5 on the inlet side of the second heat medium delivery device 21b.

The two second heat medium temperature detecting means 32 (second heat medium temperature detecting means 32a and second heat medium temperature detecting means 32b) are each configured to detect the temperature of the heat medium flowing into the heat medium heat exchanger 15, namely, the temperature of the heat medium at the inlet of the heat medium heat exchanger 15 and may include, for example, a thermistor. The second heat medium temperature detecting means 32a is provided for the pipe 5 on the inlet side of the first heat medium heat exchanger 15a. The second heat medium temperature detecting means 32b is provided for the pipe 5 on the inlet side of the second heat medium heat exchanger 15b.

The four third heat medium temperature detecting means 33 (third heat medium temperature detecting means 33a to 33d) are arranged on the side of the inlets of the heat medium flow paths of the use side heat exchangers 26 and are each configured to detect the temperature of the heat medium flowing into the use side heat exchanger 26 and may include, for example, a thermistor. The third heat medium temperature detecting means 33 whose number (four in this case) corresponds to the number of indoor units 2 installed are arranged. Incidentally, the third heat medium temperature detecting means 33a, the third heat medium temperature detecting means 33b, the third heat medium temperature detecting means 33c, and the third heat medium temperature detecting means 33d are illustrated in that order from the bottom of the drawing sheet so as to correspond to the indoor units 2.

The four fourth heat medium temperature detecting means 34 (fourth heat medium temperature detecting means 34a to 34d) are arranged on the side of the outlets of the heat medium flow paths of the use side heat exchangers 26 and are each configured to detect the temperature of the heat medium flowing out of the use side heat exchanger 26 and may include, for example, a thermistor. The fourth heat medium temperature detecting means 34 whose number (four in this case) corresponds to the number of indoor units 2 installed are arranged. Incidentally, the fourth heat medium temperature detecting means 34a, the fourth heat medium temperature detecting means 34b, the fourth heat medium temperature detecting means 34c, and the fourth heat medium temperature detecting means 34d are illustrated in that order from the bottom of the drawing sheet so as to correspond to the indoor units 2.

The first refrigerant temperature detecting means 35 is disposed on the side of an outlet of a heat-source-side refrigerant flow path of the first heat medium heat exchanger 15a and is configured to detect a temperature of the heat-source-side refrigerant flowing out of the first heat medium heat exchanger 15a and may include, for example, a thermistor.

The refrigerant pressure detecting means 36 is disposed on the side of the outlet of the heat-source-side refrigerant flow path of the first heat medium heat exchanger 15a and is configured to detect the pressure of the heat-source-side refrigerant flowing out of the first heat medium heat exchanger 15a and may include, for example, a pressure sensor.

The second refrigerant temperature detecting means 37 is disposed on the side of an inlet of a heat-source-side refrigerant flow path of the second heat medium heat exchanger 15b and is configured to detect the temperature of the heat-source-side refrigerant flowing into the second heat medium heat exchanger 15b and may include, for example, a thermistor. The third refrigerant temperature detecting means 38 is disposed on the side of an outlet of the heat-source-side refrigerant flow path of the second heat medium heat exchanger 15b and is configured to detect the temperature of the heat-source-side refrigerant flowing out of the second heat medium heat exchanger 15b and may include, for example, a thermistor.

The pipes 5 allowing the heat medium to be conveyed therethrough include a pipe (hereinafter, referred to as a "pipe 5a") connected to the first heat medium heat exchanger 15a and a pipe (hereinafter, referred to as a "pipe 5b") connected to the second heat medium heat exchanger 15b. The pipe 5a and the pipe 5b each branch out (into four in this case) in accordance with the number of indoor units 2 connected to the relay unit 3. Further, the pipe 5a and the pipe 5b are connected to each other through the heat medium flow direction switching devices 22 and the heat medium flow direction switching devices 23. Controlling the heat medium flow direction switching devices 22 and the heat medium flow direction switching devices 23 determines whether the heat medium flowing through the pipe 5a is allowed to flow into the use side heat exchangers 26 or whether the heat medium flowing through the pipe 5b is allowed to flow into the use side heat exchangers 26.

In this air conditioning apparatus 100, the compressor 10, the four-way valve 11, the heat source side heat exchanger 12, the first heat medium heat exchanger 15a, and the second heat medium heat exchanger 15b are sequentially connected in series by the refrigerant pipes 4, thus constituting a refrigeration cycle. Further; the first heat medium heat exchanger 15a, the first heat medium delivery device 21a, and each use side heat exchanger 26 are sequentially connected in series by the pipe 5a, thus constituting a heat medium circulation circuit. Similarly, the second heat medium heat exchanger 15b, the second heat medium delivery device 21b, and each use side heat exchanger 26 are sequentially connected in series by the pipe 5b, thus constituting a heat medium circulation circuit. In other words, the plurality of use side heat exchangers 26 are connected in parallel to each of the heat medium heat exchangers 15, thus providing a plurality of heat medium circulation circuits.

Specifically, the outdoor unit 1 and the relay unit 3 are connected to each other through the first heat medium heat exchanger 15a and the second heat medium heat exchanger 15b arranged in the relay unit 3. In addition, the relay unit 3 and each indoor unit 2 are connected to each other through the first heat medium heat exchanger 15a and the second heat medium heat exchanger 15b such that the heat-source-side refrigerant, serving as a primary refrigerant, circulating in the refrigeration cycle exchanges heat with the heat medium, serving as a secondary refrigerant, circulating in the heat medium circulation circuit in the first heat medium heat exchanger 15a and the second heat medium heat exchanger 15b.

The kind of refrigerant used in the refrigeration cycle and the heat medium circulation circuit will now be described.

In the refrigeration cycle, for example, a non-azeotropic refrigerant, such as R407C, a near-azeotropic refrigerant, such as R410A, or a single refrigerant, such as R22, can be used. Alternatively, a natural refrigerant, such as carbon dioxide or hydrocarbon, may be used. The use of the natural refrigerant as the heat-source-side refrigerant has an advantage in that the global warming effect caused by leakage of the refrigerant can be suppressed.

The heat medium circulation circuits are connected to the use side heat exchangers 26 in the indoor units 2 as described above. Accordingly, the air conditioning apparatus 100 is premised on the use of a safer heat medium in consideration of the possibility that the heat medium leaks in a room or the like where the indoor unit 2 is installed. As regards the heat medium, therefore, for example, water, antifreeze solution, or a mixture of water and antifreeze can be used. With this configuration, the leakage of the refrigerant caused by freeze or corrosion can be suppressed even at a low outside air temperature, thus providing high reliability. Further, when the indoor unit 2 is installed in a place which dislikes moisture, e.g., a computer room, a high heat insulating fluorinated inactive liquid can be used as the heat medium.

This air conditioning apparatus 100 is capable of allowing each indoor unit 2 to perform the cooling operation or the heating operation in accordance with an instruction from the indoor unit 2. Specifically, the air conditioning apparatus 100 can allow all of the indoor units 2 to perform the same operation and also allow the indoor units 2 to perform different operations. As will be described below, four operation modes performed by the air conditioning apparatus 100 include a cooling only operation mode in which all of the driving indoor units 2 perform the cooling operation, a heating only operation mode in which all of the driving indoor units 2 perform the heating operation, a cooling main operation mode in which a cooling load is larger, and a heating main operation mode in which a heating load is larger. The cooling main operation mode, in which cooling and heating are mixed and the cooling load is mainly dominant, of the operation modes will be described.

[Cooling Main Operation Mode]

Figure 2:
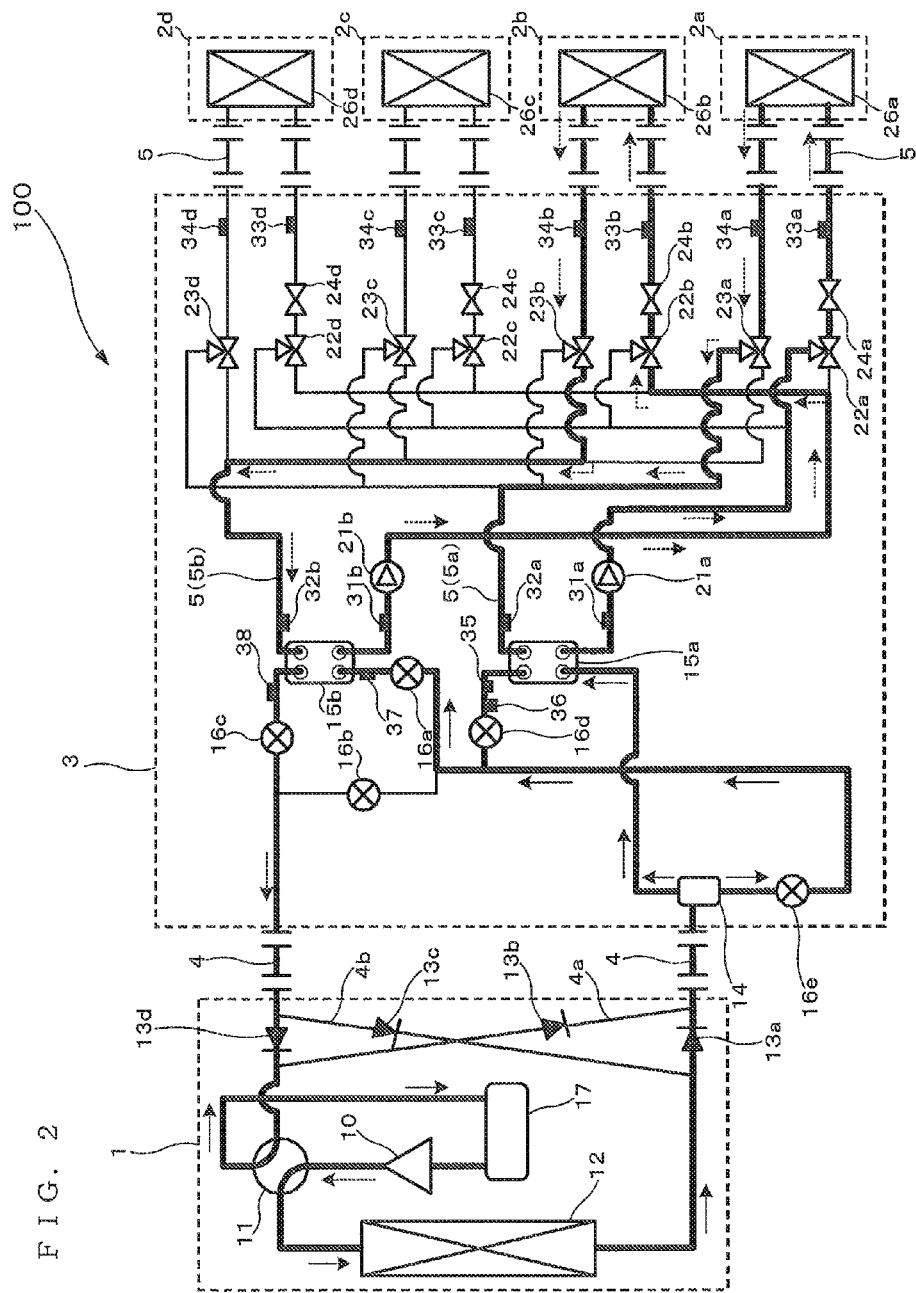
FIG. 2 is a refrigerant circuit diagram illustrating the flow of a refrigerant in a cooling main operation mode of the air conditioning apparatus.

FIG. 2 is a refrigerant circuit diagram illustrating the flow of the refrigerant in the cooling main operation mode of the air conditioning apparatus 100. The cooling main operation mode will be described with respect to a case where a heating load occurs in the use side heat exchanger 26a and a cooling load occurs in each of the use side heat exchangers 26b to 26d with reference to FIG. 2. Incidentally, in FIG. 2, pipes indicated by thick lines denote pipes through which the refrigerant (the heat-source-side refrigerant and the heat medium) circulates. Further, the direction in which the heat-source-side refrigerant flows is indicated by solid line arrows and the direction in which the heat medium flows is indicated by broken line arrows.

The flaw of the heat-source-side refrigerant in the refrigeration cycle will first be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the four-way valve 11 and flows into the heat source side heat exchanger 12. Then, the refrigerant is condensed to a gas-liquid two-phase refrigerant in the heat source side heat exchanger 12 while dissipating heat to outdoor air. The gas-liquid two-phase refrigerant flowing out of the heat source side heat exchanger 12 passes through the check valve 13a, flows out of the outdoor unit 1, and flows through the refrigerant pipe 4 into the relay unit 3. The gas-liquid two-phase refrigerant flowing into the relay unit 3 flows into the liquid separator 14 and is separated into a gas refrigerant and a liquid refrigerant.

The gas refrigerant separated by the liquid separator 14 flows into the first heat medium heat exchanger 15a. The gas refrigerant flowing into the first heat medium heat exchanger 15a is condensed to a liquid refrigerant while dissipating heat to the heat medium circulating in the heat medium circulation circuit. The liquid refrigerant flowing out of the first heat medium heat exchanger 15a passes through the expansion device 16d. On the other hand, the liquid refrigerant separated by the liquid separator 14 passes through the expansion device 16e and joins the liquid refrigerant, condensed by the first heat medium heat exchanger 15a and passed through the expansion device 16d. The resultant refrigerant is throttled by the expansion device 16a, so that it is expanded to become a low-temperature low-pressure gas-liquid two-phase refrigerant. The refrigerant flows into the second heat medium heat exchanger 15b.

This gas-liquid two-phase refrigerant absorbs heat from the heat medium, circulating in the heat medium circulation circuit, in the second heat medium heat exchanger 15b, functioning as an evaporator, while cooling the heat medium, so that it becomes a low-temperature low-pressure gas refrigerant. The gas refrigerant flowing out of the second heat medium heat exchanger 15b passes through the expansion device 16c and then flows out of the relay unit 3 and flows through the refrigerant pipe 4 into the outdoor unit 1. The refrigerant flowing into the outdoor unit 1 passes through the check valve 13d and further passes through the four-way valve 11 and the accumulator 17 and is again sucked into the compressor 10. Note that the expansion device 16b has a small opening so that the refrigerant does not flow therethrough and the expansion device 16c is fully opened to prevent damage caused by pressure.

Subsequently, the flow of the heat medium in the heat medium circulation circuit will be described.

The heat medium, pressurized and flowed out of the first heat medium delivery device 21a, passes through the heat medium flow direction switching device 22a and the heat medium flow rate control device 24a and flows into the use side heat exchanger 26a. Then, the heat medium provides heat to indoor air in the use side heat exchanger 26a to perform heating in an air conditioning target area, e.g., a room where the indoor unit 2 is installed. Further, the heat medium, pressurized and flowed out of the second heat medium delivery device 21b, passes through the heat medium flow direction switching device 22b and the heat medium flow rate control device 24b and flows into the use side heat exchanger 26b. The heat medium absorbs heat from indoor air in each of the use side heat exchanger 26b to perform cooling in an air conditioning target area, e.g., a room where the indoor unit 2 is installed.

As regards the heat medium used for the heating operation, the heat medium flow rate control device 24a allows the heat medium of a flow rate necessary to cover an air conditioning load required in the air conditioning target area to flow into the use side heat exchanger 26a. Then, the heat medium used for the heating operation passes through the heat medium flow direction switching device 23a and flows into the first heat medium heat exchanger 15a and is again sucked into the first heat medium delivery device 21a.

As regards the heat medium used for the cooling operation, the heat medium flow rate control device 24b allow the heat medium of a flow rate necessary to cover an air conditioning load required in the air conditioning target area to flow into the use side heat exchanger 26b. Then, the heat medium used for the cooling operation passes through the heat medium flow direction switching device 23b and flows into the second heat medium heat exchanger 15b and is again sucked into the second heat medium delivery device 21b.

FIG. 3 is a refrigerant circuit diagram illustrating the schematic configuration of the valve block unit 300 in the air conditioning apparatus 100. The configuration of the valve block unit 300 will be described with reference to FIG. 3. In Embodiment 1, a portion surrounded by a broken line in FIG. 3 is formed into a block and is constructed as the valve block unit 300. As will be seen from FIG. 3, the valve block unit 300 includes the heat medium flow direction switching devices 22, the heat medium flow direction switching devices 23, the heat medium flow rate control devices 24, a cooling outward-flow main pipe 307, a heating outward-flow main pipe 308, a cooling return-flow main pipe 305, a heating return-flow main pipe 306, first branch pipes 301, and second branch pipes 302.

Incidentally, the cooling outward-flow main pipe 307, the heating outward-flow main pipe 308, the cooling return-flow main pipe 305, the heating return-flow main pipe 306, the first branch pipes 301, and the second branch pipes 302 constitute parts of the above-described pipes 5. Further, the first branch pipes 301 each serve as a flow path guiding the heat medium to a load side (the indoor unit 2). The second branch pipes 302 each serve as a flow path through which the heat medium returns from the load side (the indoor unit). The first branch pipes 301 and the second branch pipes 302 will be described in more detail with reference to FIG. 5.

Each heat medium flow direction switching device 22 and each heat medium flow direction switching device 23 correspond to at least one flow direction switching means including a valve body. The cooling outward-flow main pipe 3 corresponds to a first pipe in which conduction of the heat medium is selectively switched by the heat medium flow direction switching device 22. The heating outward-flow main pipe 308 corresponds to a second pipe in which the conduction of the heat medium is selectively switched by the heat medium flow direction switching device 22. The cooling return-flow main pipe 305 corresponds to the first pipe in which the conduction of the heat medium is selectively switched by the heat medium flow direction switching device 23. The heating return-flow main pipe 306 corresponds to the second pipe in which the conduction of the heat medium is selectively switched by the heat medium flow direction switching device 23.

Specifically, the valve block unit 300 according to Embodiment 1 includes four valve blocks coupled to one another, each valve block including a set of the heat medium flow direction switching device 22, the cooling outward-flow main pipe 307, the heating outward-flow main pipe 308, and the first branch pipe 301 and another set of the heat medium flow direction switching device 23, the cooling return-flow main pipe 305, the heating return-flow main pipe 306, and the second branch pipe 302. Incidentally, FIG. 3 illustrates a state where the heat medium flow rate control devices 24 are arranged within the valve block unit 300. The heat medium flow rate control devices 24 are not necessarily needed and may be provided for the second branch pipes 302.

In this valve block unit 300, since hot water and cold water flow on the inside thereof, heat interference occurs, thus causing a degradation in performance. Accordingly, it is preferred to use a material (metal material or plastic material) having a low thermal conductivity as a main material. The metal material includes, for example, stainless steel, brass, bronze, or aluminum. The plastic material includes, for example, PPS (polyphenylene sulfide), PPE (polyphenylene ether), cross-linked polyethylene, or polybutene. Further, in order to reduce the weight of the valve block unit 300, it is more preferable to use the plastic material as the main material.

Figure 4:
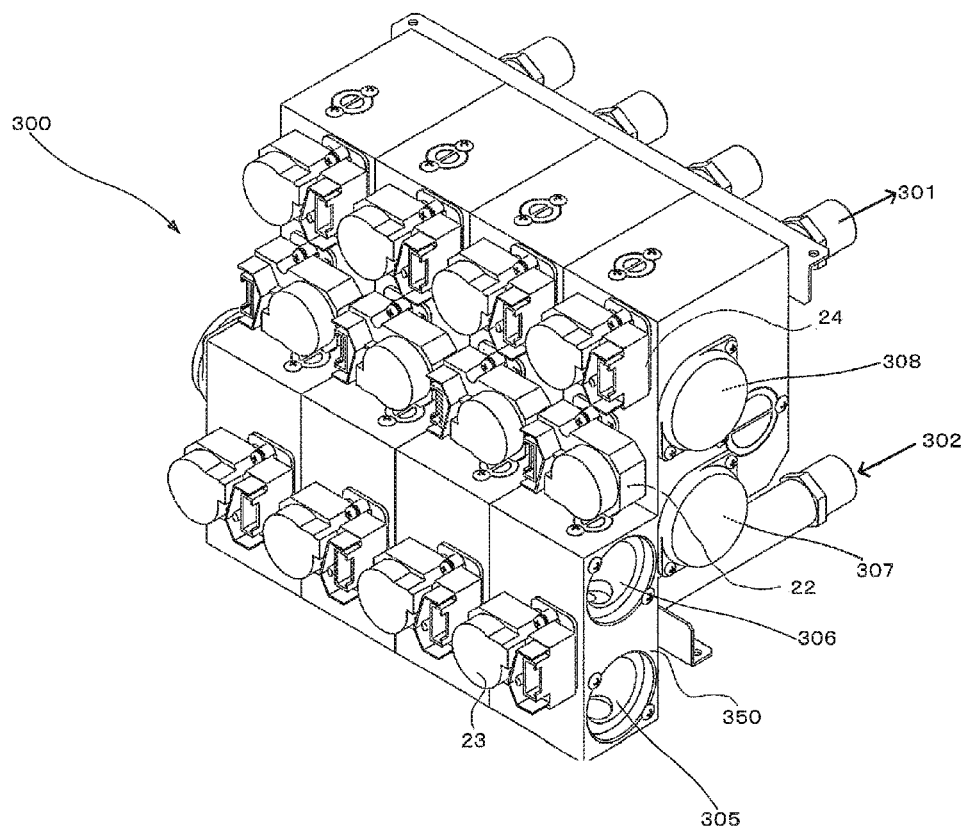
FIG. 4 is a perspective view illustrating the details of the configuration of the valve block unit.

FIG. 4 is a perspective view illustrating the details of the configuration of the valve block unit 300. The configuration of the valve block unit 300 will be described in more detail with reference to FIG. 4. The valve block unit 300 illustrated in FIG. 4 includes four valve blocks 350 (valve block 350a to valve block 350d) coupled to one another such that the valve blocks are connected to the four indoor units 2. Each valve block 350 includes the heat medium flow direction switching device 22, the heat medium flow direction switching device 23, and the heat medium flow rate control device 24 which cover one branch. In other words, the valve block unit 300 according to Embodiment 1 is divided into four branches.

Figure 4A:
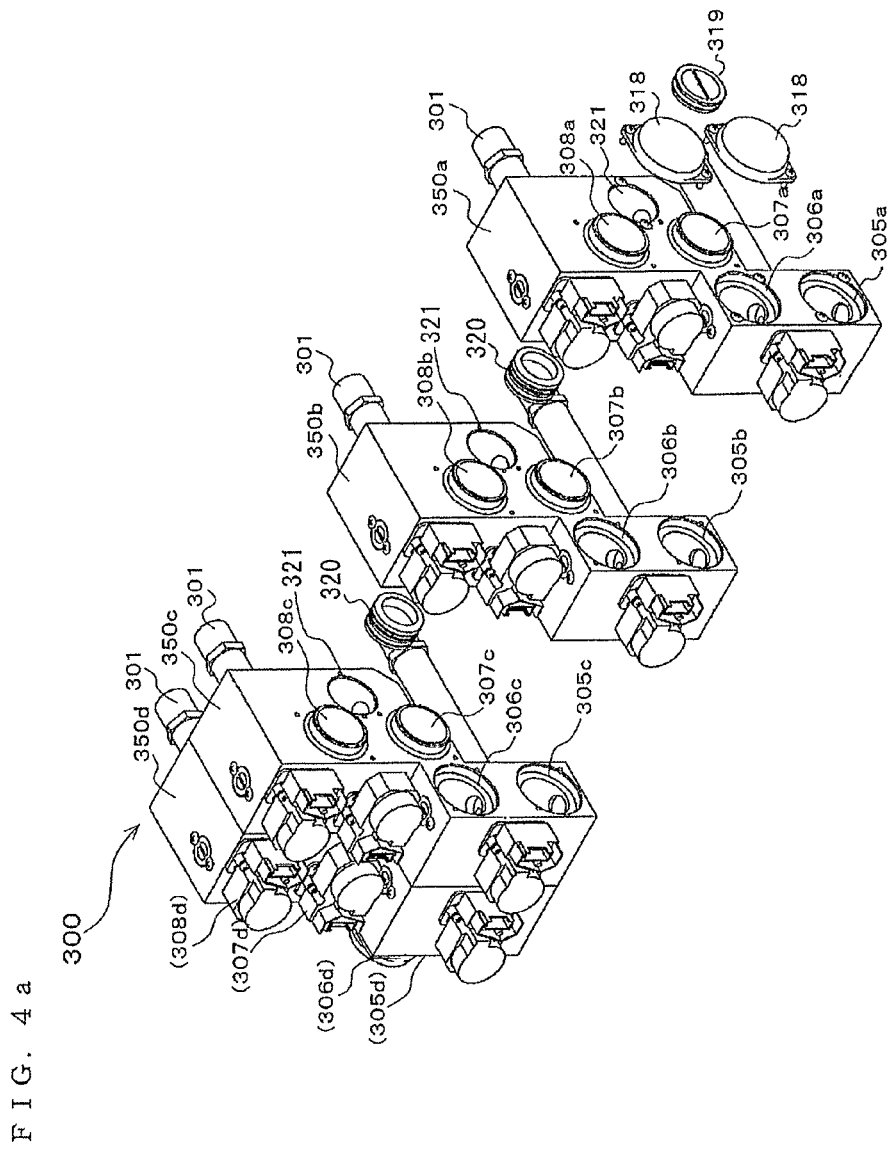
FIG. 4a is an exploded perspective view illustrating an exploded state of the valve block unit.

FIG. 4a is an exploded perspective view illustrating an exploded state of the valve block unit 300. The assembly of the valve block unit 300 divided into four branches will be described with reference to FIG. 4a. As described above, the valve block unit 300 is constructed by coupling the valve block 350a, the valve block 350b, the valve block 350c, and the valve block 350d to one another.

In addition, the cooling outward-flow main pipes 307 (illustrated as a cooling outward-flow main pipe 307a, a cooling outward-flow main pipe 307b a cooling outward-flow main pipe 307c, and a cooling outward-flow main pipe 307d in that order from the right of the drawing sheet) of the valve blocks 350, the heating outward-flow main pipes 308 (illustrated as a heating outward-flow main pipe 308a, a heating outward-flow main pipe 308b, a heating outward-flow main pipe 308c, and a heating outward-flow main pipe 308d in that order from the right from the drawing sheet), the cooling return-flow main pipes 305 (illustrated as a cooling return-flow main pipe 305a, a cooling return-flow main pipe 305b, a cooling return-flow main pipe 305c, and a cooling return-flow main pipe 305d in that order from the right of the drawing sheet), and the heating return-flow main pipes 306 (illustrated as a heating return-flow main pipe 306a, a heating return-flow main pipe 306b, a heating return flow main pipe 306c, and a heating return-flow main pipe 306d in that order from the right of the drawing sheet) are coupled, respectively, thus constructing the main pipes (the pipes 5).

One end of each of the main pipes (the cooling outward-flow main pipes 307, the heating outward-flow main pipes 308, the cooling return-flow main pipes 305, and the heating return-flow main pipes 306) is female-like and the other end thereof is male-like which is coupleable to the female-like end so that the valve blocks 350 can be coupled to one another. Further, the cooling outward-flow main pipe 307a and the heating outward-flow main pipe 308a of the valve block 350a positioned on one of both ends of the valve block unit 300 are provided with caps 318 which close them. On the other hand, the cooling return-flow main pipe 305d and the heating return-flow main pipe 306d of the valve block 350d positioned on the other one of both the ends of the valve block unit 300 are provided with caps 319 which close them.

Targets closed by the caps 318 and the caps 319 are two main pipes of the four main pipes. In other words, in the valve block 350a, the cooling outward-flow main pipe 307a and the heating outward-flow main pipe 308a are closed by the caps 318 and the cooling return-flow main pipe 305a and the heating return-flow main pipe 306a are not closed by the caps 319. The heating return-flow main pipe 306a is connected to the suction side of the heating side pump (the first heat medium delivery device 21a) and the cooling return-flow main pipe 305a is connected to the suction side of the cooling side pump (the second heat medium delivery device 21b).

Figure 4B:
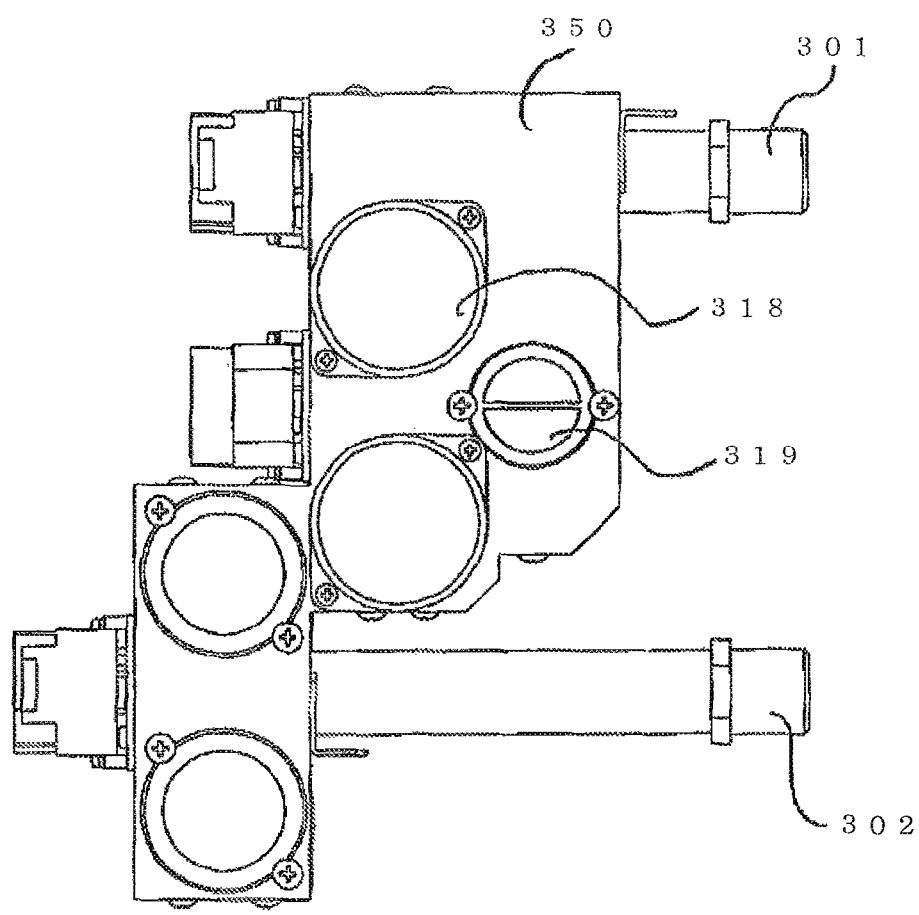
FIG. 4b is a sectional view of the valve block unit.

On the other hand, in the valve block 350d, the cooling return-flow main pipe 305d and the heating return-flow main pipe 306d are closed by the caps 319 and the cooling outward-flow main pipe 307d and the heating outward-flow main pipe 308d are not closed by the caps 318. The heating outward-flow main pipe 308d is connected to the discharge side of the heating side pump and the cooling outward-flow main pipe 307d is connected to the discharge side of the cooling side pump. Note that the caps 318 and the caps 319 each have a shape corresponding to the shape of the end of each pipe. Referring to FIG. 4a, the caps 318 each have a shape (a cover-like shape covering the end of the pipe) corresponding to the male-like end of the pipe. As illustrated in FIG. 4b, each of the caps (the caps 318 and the caps 319) has tabs disposed in the ends thereof so that the cap is fixed by screws and is screwed to the main body of the valve block. The caps 319 each have a shape corresponding to the female-like end of the pipe and are fixed by screw heads as illustrated in FIG. 4b.

As will be seen from FIG. 4a, the valve block unit 300 can switch between the heat medium flow paths and also includes the main pipes constructed by coupling the plurality of valve blocks 350 to one another. This valve block unit 300 can simplify piping around the valves as compared to a configuration in which the flow direction switching devices and the pipes are separately arranged. Therefore, a unit (the relay unit 3 in Embodiment 1) including the valve block unit 300 can be made compact. Incidentally, sacrificed holes 321 illustrated in FIG. 4a are necessary for formation of the flow paths in the valve blocks 350. Since the sacrificed hole 321 has to be independent for each valve block unit 300, the sacrificed hole 321 is blocked by coupling means 320, serving as a joint, in FIG. 4a.

Figure 4C:
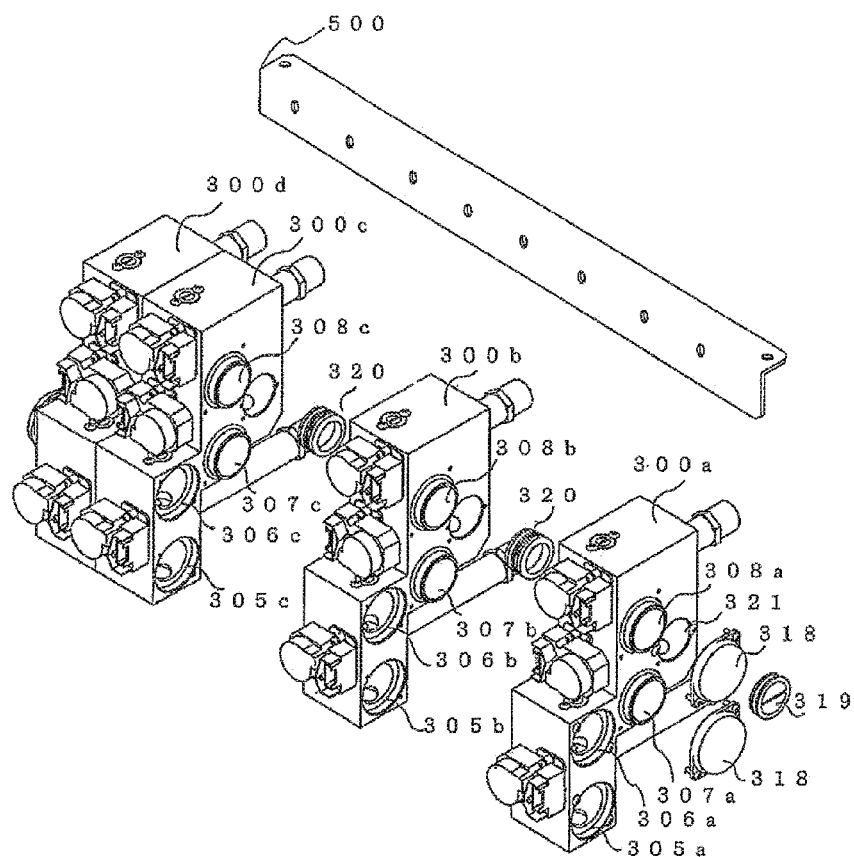
FIG. 4c is a diagram illustrating a method of coupling for the valve block unit.

FIG. 4c is a diagram illustrating coupling of the valve blocks 350. The valve blocks 350 can be coupled to one another and be divided into branches in accordance with the number of indoor units 2. The main pipes are coupled by the coupling means 320. For through-holes as the main pipes arranged on both the ends, for example, the through-holes which are not connected to external pipes are closed by the caps 318 and 319. In addition, after the coupling of the valve blocks 350, the valve blocks 350 are fixed to a coupling plate 500 by, for example, screws, thus constituting the valve block unit 300. Consequently, the valve block unit 300 is constructed such that the coupled valve blocks 350 are prevented from disconnecting from one another due to the pressure of the heat medium passing through the main pipes or the like of the valve block unit 300 and is accommodated in a housing (not illustrated).

Figure 5:
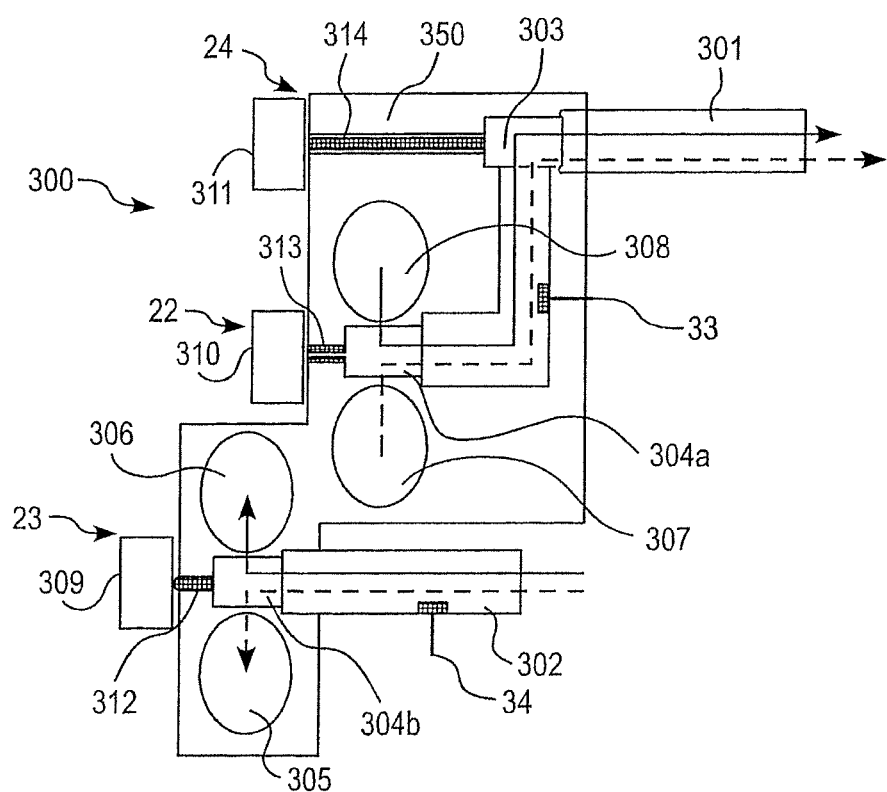
FIG. 5 is a longitudinal sectional view schematically illustrating the sectional configuration of a valve block.

FIG. 5 is a longitudinal sectional view schematically illustrating the sectional configuration of the valve block 350. The configuration of the valve block 350 constituting the valve block unit 300 will be described together with the flow of the heat medium with reference to FIG. 5. The first branch pipe 301 corresponds to a third pipe which selectively communicates with the cooling outward-flow main pipe 307 or the heating outward-flow main pipe 308. In other words, the first branch pipe 301 is configured to communicate with the cooling outward-flow main pipe 307 or the heating outward-flow main pipe 308 selectively switched by the heat medium flow path switching device 22. The second branch pipe 302 corresponds to the third pipe which selectively communicates with the cooling return-flow main pipe 305 or the heating return-flow main pipe 306. In other words, the second branch pipe 302 is configured to communicate with the cooling return-flow main pipe 305 or the heating return-flow main pipe 306 selectively switched by the heat medium flow direction switching device 23.

Referring to FIG. 5, the third heat medium temperature detecting means 33 and the fourth heat medium temperature detecting means 34 are mounted within the pipes. The third heat medium temperature detecting means 33 is mounted in the flow path inside the valve block 350. The first branch pipe 301 and the second branch pipe 302 include, for example, a copper pipe. When the valve block unit 300 is made of plastic, the first branch pipe 301 and the second branch pipe 302 are connected to extension pipes (not illustrated) by brazing upon mounting. At this time, the plastic forming the valve block unit 300 may be melted due to heat conduction. Accordingly, brazing is generally performed while the first branch pipe 301 and the second branch pipe 302 are disconnected from the valve block 350.

When the temperature detecting means is fixed to the surface of a pipe in a conventional manner, there is a high possibility that the temperature detecting means will be detached upon brazing. At the completion of construction, the temperature detecting means is not necessarily attached again. In other words, there is a possibility that the temperature detecting means will not be attached. The reliability of the apparatus is reduced. In the valve block unit 300 according to this embodiment, therefore, the temperature detecting means (the third heat medium temperature detecting means 33, the fourth heat medium temperature detecting means 34) are embedded in the pipes or flow paths as illustrated in FIG. 5, thus eliminating a risk of detaching the temperature detecting means. Consequently, the reliability of the apparatus is increased.

As described above, the heat medium flow direction switching device 22, the heat medium flow direction switching device 23, and the heat medium flow rate control device 24 are provided for each valve block. The heat medium flow direction switching device 22 includes valve body rotating means 310, a valve body 304a, and a valve rod 313 connecting them. The valve body rotating means 310 is configured to rotate the valve body 304a about the rotation axis (not illustrated). The rotation of the valve body rotating means 310 is transmitted through the valve rod 313 to the valve body 304a.

The heat medium flow direction switching device 23 includes valve body rotating means 309, a valve body 304b, and a valve rod 312 connecting them. The valve body rotating means 309 is configured to rotate the valve body 304b about the rotation axis (not illustrated). The rotation of the valve body rotating means 309 is transmitted through the valve rod 312 to the valve body 304b. The heat medium flow rate control device 24 includes valve body rotating means 311, a valve body 303, and a valve rod 314 connecting them. The valve body rotating means 311 is configured to rotate the valve body 303 about the rotation axis (not illustrated). The rotation of the valve body rotating means 311 is transmitted through the valve rod 314 to the valve body 303.

The valve body rotating means 309, the valve body rotating means 310, and the valve body rotating means 311 include, for example, a stepping motor which can be driven in accordance with a pulse signal supplied by control means (not illustrated). The valve body rotating means 309, the valve body rotating means 310, and the valve body rotating means 311 may include another motor, e.g., a geared motor instead of the stepping motor. Further, the valve body 304a and the valve body 304b will be described in detail later with reference to FIG. 6 and the valve body 303 will be described in detail later with reference to FIG. 7.

The valve body 304a on the feed side of the heat medium flow direction switching device 22 is disposed at a connection portion between the first branch pipe 301 and the cooling outward-flow main pipe 307 and the heating outward-flow main pipe 308. Similarly, the valve body 304b on the feed side of the heat medium flow direction switching device 23 is disposed at a connection portion between the second branch pipe 302 and the cooling return-flow main pipe 305 or the heating return-flow main pipe 306. In other words, the valve body 304a and the valve body 304b are rotated to allow communication of the cooling main pipes (broken line arrows illustrated in FIG. 5) or the heating main pipes (solid line arrows illustrated in FIG. 5) such that switching between cooling and heating can be performed. When the valve body 303 of the heat medium flow rate control device 24 is rotated, the opening area is changed so that the flow rate of the heat medium fed to the indoor unit 2 can be adjusted.

Figure 6:
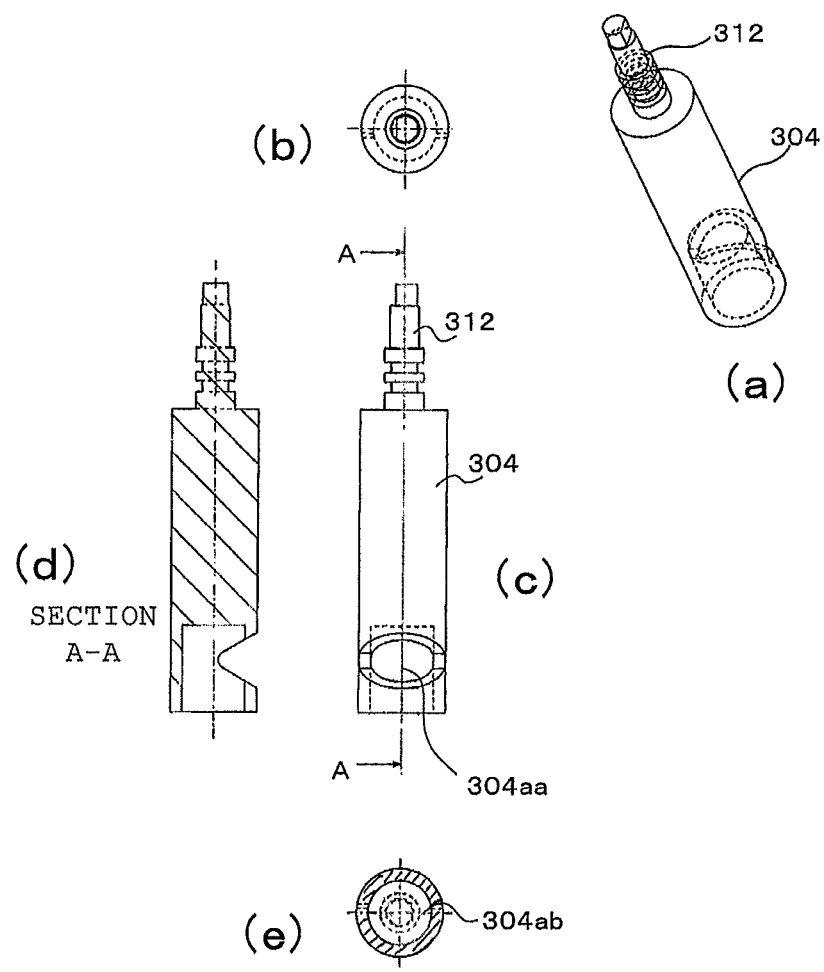
FIG. 6 is an explanatory diagram explaining a valve body.

FIG. 6 is an explanatory diagram explaining the valve body 304 (the valve body 304a and the valve body 304b). The valve body 304 will be described in detail with reference to FIG. 6. FIG. 6(a) is a perspective view of the valve body 304, FIG. 6(b) is a plan view of the valve body 304, FIG. 6(c) is a front view of the valve body 304 (a side elevational view thereof when viewed from the side of an aperture formation surface), FIG. 6(d) is a sectional view of the valve body 304 taken along the line A-A, and FIG. 6(e) is a bottom view of the valve body 304. Incidentally, the valve rod 312 (the same applies to the valve rod 313) is also illustrated in FIG. 6. Note that FIG. 6 illustrates that the longitudinal direction of the valve body 304 corresponds to the up-and-down direction. Actually, the valve body 304 is disposed such that the longitudinal direction thereof corresponds to the horizontal direction as illustrated in FIG. 5.

The valve body 304 is shaped in a cylinder. This valve body 304 has an aperture 304aa which is elliptically-shaped (a shape when the aperture 304aa is viewed from the front). When this aperture 304aa is viewed from the side, the aperture 304aa is tapered such that its diameter is reduced toward the center axis of the valve body 304. The valve body 304 is hollow in a position where the aperture 304aa is disposed to provide a flow path 304ab which communicates with the aperture 304aa.

Specifically, when the aperture 304aa of the valve body 304a faces downward (the lower side in the arrangement of FIG. 5), the first branch pipe 301 communicates with the cooling outward-flow main pipe 307. While the aperture 304aa faces the cooling outward-flow main pipe 307, the heat medium passes through the aperture 304aa, flows inside the valve body 304a, and passes through the flow path 304ab, so that the heat medium is fed to the indoor unit 2 (the broken line arrow illustrated in FIG. 5). On the other hand, when the aperture 304aa of the valve body 304a faces upward (the upper side in the arrangement of FIG. 5), the first branch pipe 301 communicates with the heating outward-flow main pipe 308. While the aperture 304aa faces the heating outward-flow main pipe 308, the heat medium passes through the aperture 304aa, passes inside the valve body 304a, and passes through the flow path 304ab, so that the heat medium is fed to the indoor unit 2 (the solid line arrow illustrated in FIG. 5).

Similarly, when the aperture 304aa of the valve body 304b faces downward (the lower side in the arrangement of FIG. 5), the second branch pipe 302 communicates with the cooling return-flow main pipe 305. While the aperture 304aa faces the cooling return-flow main pipe 305, the heat medium passes through the flow path 304ab, passes inside the valve body 304b, and passes through the aperture 304aa, so that the heat medium flows into the cooling return-flow main pipe 305 (the broken line arrow illustrated in FIG. 5). On the other hand, when the aperture 304aa of the valve body 304b faces upward (the upper side in the arrangement of FIG. 5), the second branch pipe 302 communicates with the heating return-flow main pipe 306. While the aperture 304aa faces the heating return-flow main pipe 306, the heat medium passes through the flow path 304ab, passes inside the valve body 304b, and passes through the aperture 304aa, so that the heat medium flows into the heating return-flow main pipe 306 (the solid line arrow illustrated in FIG. 5).

Figure 7:
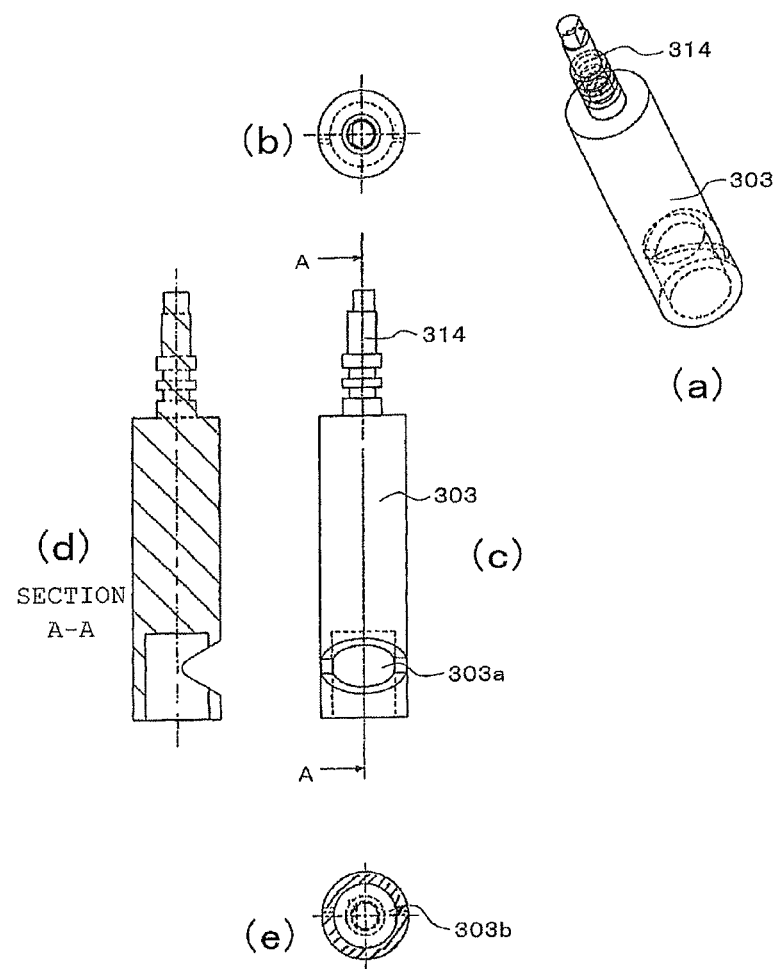
FIG. 7 is an explanatory diagram explaining a valve body.
Figure 8:
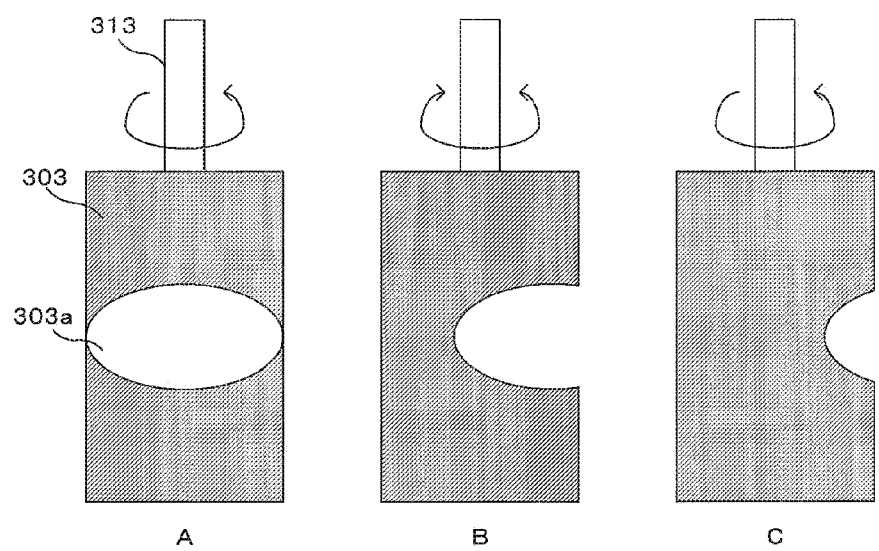
FIG. 8 is a schematic diagram illustrating rotating states of a valve body.

FIG. 7 is an explanatory diagram explaining the valve body 303. FIG. 8 is a schematic diagram illustrating the states of rotation of the valve body 303. The valve body 303 will be described in detail with reference to FIGS. 7 and 8. FIG. 7(a) is a perspective view of the valve body 303. FIG. 7(b) is a plan view of the valve body 303, FIG. 7(c) is a front view of the valve body 303 (a side elevational view thereof when viewed from the side of an aperture formation surface), FIG. 7(d) is a sectional view of the valve body 303 taken along the line A-A, and FIG. 7(e) is a bottom view of the valve body 303. Incidentally, the valve rod 314 is also illustrated in FIG. 7. Note that FIG. 7 illustrates that the longitudinal direction of the valve body 303 corresponds to the up-and-down direction. Actually, the valve body 303 is disposed such that the longitudinal direction thereof corresponds to the horizontal direction as illustrated in FIG. 5.

The valve body 303 is a valve body of the heat medium flow rate control device 24 to adjust the flow rate of the heat medium flowing into the indoor unit 2. This valve body 303 is constructed in a manner similar to the valve body 304 described with reference to FIG. 6. Specifically, the valve body 303 is shaped in a cylinder and has an aperture 303a which is elliptically-shaped (a shape when the aperture 303a is viewed from the front) and is hollow in a position where the aperture 303a is disposed to provide a flow path 303b which communicates with the aperture 303a.

An operation of the heat medium flow rate control device 24 will be described in brief. The control means (not illustrated) calculates a necessary opening on the basis of information obtained from the third heat medium temperature detecting means 33 and the fourth heat medium temperature detecting means 34 and transmits the number of necessary pulses to the valve body rotating means 311. The valve body rotating means 311 rotates as much as the received number of necessary pulses to rotate the valve body 303. As illustrated in FIG. 8, the valve body 303 is rotated, so that the opening area of the aperture 303a can be adjusted. Consequently, the flow rate of the heat medium can be adjusted. Specifically, when the opening area of the aperture 303a is adjusted (to a fully opened state of FIG. 8(A), a partly opened state of FIG. 8(B), or an opening smaller than the partly opening in FIG. 8(C)), the flow rate of the heat medium flowing through the first branch pipe 301 can be variably adjusted.

As described above, the cooling outward-flow main pipe 307 and the heating return-flow main pipe 306 are arranged adjacent to each other (next to each other in the horizontal direction (lateral direction) at substantially the same level). With this arrangement, the height (the length in the up-and-down direction in the arrangement of FIG. 5) of the valve block 350 can be reduced. Further, since the cooling outward-flow main pipe 307, the heating outward-flow main pipe 308, the cooling return-flow main pipe 305, and the heating return-flow main pipe 306 are incorporated into one valve block 350, the valve block 350 can be remarkably reduced in size as compared to a configuration in which the above main pipes are separately arranged.

In the cooling only operation or the heating only operation, since the whole of the heat medium flows through the cooling outward-flow main pipes 307, the heating outward-flow main pipes 308, the cooling return-flow main pipes 305, and the heating return-flow main pipes 306 for cooling and heating, the diameter of the main pipes (the pipes 5) including these pipes should be large. For example, in the cooling only operation or the heating only operation when water is used as a heat medium with a capacity of about 10 horsepower, water of about 85 liters/min flows. When water is used as a heat medium, the flow velocity is suppressed to 2.0 [m/s] or less in terms of protection against corrosion. Assuming that the thickness of a pipe is 1.0 [mm], a pipe having a diameter of about 32 [mm] should be selected. When such a thick pipe is bent or worked, there are many restrictions, e.g., the bending radius cannot be reduced. A considerable space is needed. Accordingly, the size of the apparatus is considerably large.

On the contrary, in the valve block 350 according to Embodiment 1, the four main pipe components and the valve bodies are provided for one valve block 350 and the plurality of valve block units 350 are coupled to one another, so that the cooling outward-flow main pipe, the heating outward-flow main pipe, the cooling return-flow main pipe, and the heating return-flow main pipe are automatically formed and piping around the valves is simplified. Thus, a significant reduction in size can be achieved. Further, the male-like and female-like coupling portions (pipe ends) are provided in order to easily couple the valve block units 300 and sealing means 316 is an O-ring. Thus, manufacturing time is remarkably reduced, thus increasing productivity.

Further, the longitudinal direction of each of the valve body 303, the valve body 304a, and the valve body 304b is set not to the up-and-down direction (vertical direction) but to the horizontal direction, so that the first branch pipe 301 and the second branch pipe 302 to the indoor unit 2 can also be laterally arranged pipes. Thus, the height (the length in the up-and-down direction in the arrangement of FIG. 5) of the valve block 350 can be further reduced. In addition, the valve body rotating means 309, the valve body rotating means 310, and the valve body rotating means 311 are laterally arranged, so that the valve block 350 can be remarkably reduced in thickness (the length in the up-and-down direction in the arrangement of FIG. 5 can be reduced). Since the relay unit 3 including the valve block unit 300 is often accommodated in a narrow space in the ceiling, a reduction in height, namely, a reduction in thickness is an important factor.

Figure 9:
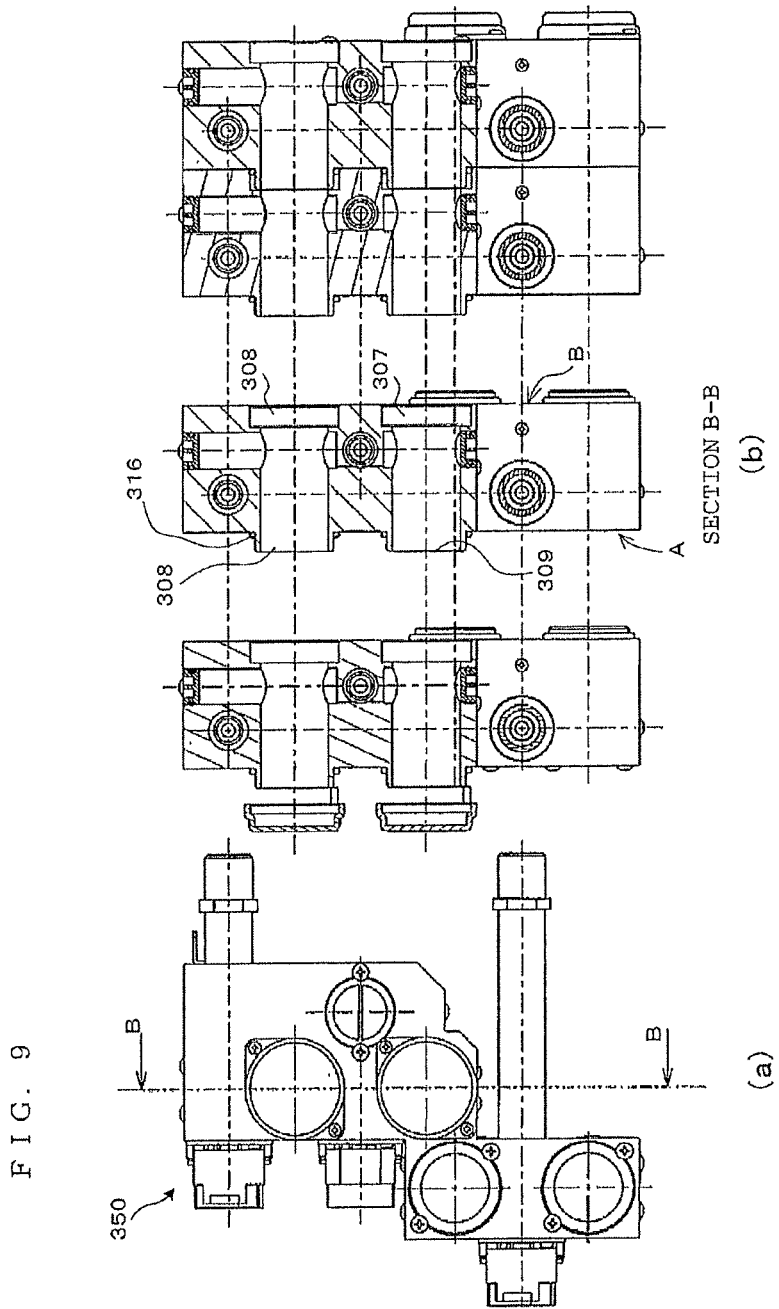
FIG. 9 is an explanatory diagram explaining coupling of the valve blocks.

FIGS. 9 and 10 are explanatory diagrams explaining coupling of the valve blocks 350. The coupling of the valve blocks 350 will be described in detail with reference to FIGS. 9 and 10. FIG. 9(a) is a side elevational view of the valve block 350 and FIG. 9(b) is a sectional view of the valve blocks 350 taken along the line B-B of FIG. 9(a) while they are being coupled. In addition, FIG. 10 is a perspective view of the valve blocks 350 while they are being coupled. As described above, one end of each of the main pipes (the cooling outward-flow main pipe 307, the heating outward-flow main pipe 308, the cooling return-flow main pipe 305, and the heating return-flow main pipe 306) is female-like and the other end thereof is male-like which is coupleable to the female-like end.

The end of the heating outward-flow main pipe 308 on the side A (the left side of the drawing sheet) of each valve block 350 is a male-like coupling portion. The sealing means 316 is attached to the periphery of this end of the heating outward-flow main pipe 308 so that the valve block 350 can be coupled to another valve block 350. Further, the end of the cooling outward-flow main pipe 307 on the side B (the right side of the drawing sheet) of the valve block 350 is a female-like coupling portion. As regards the sealing means 316, for example, it is preferred to use an O-ring. Alternatively, another sealing member, e.g., a flat packing may be used as the sealing means 316.

With this configuration, as illustrated in FIGS. 9 and 10, the plurality of valve blocks 350 can be easily coupled to one another and the number of branches can be flexibly changed. In addition, since the valve blocks 350 can be easily coupled, the workability (productivity) of the valve block 350 is increased, so that a reduction in cost can also be achieved. Incidentally, although the cooling outward-flow main pipe 307 and the heating outward-flow main pipe 308 have been described as an example in FIGS. 9 and 10, the same applies to the cooling return-flow main pipe 305 and the heating return-flow main pipe 306.

Incidentally, if the cooling side pipe 5 (the cooling outward-flow main pipe 307, the cooling return-flow main pipe 305) is close to the heating side pipe 5 (the heating outward-flow main pipe 308, the heating return-flow main pipe 306), heat interference is caused. When the heat interference is caused, the temperature of the heat medium flowing through the cooling side pipe 5 rises and, conversely, the temperature of the heat medium flowing through the heating side pipe 5 falls. This may cause a degradation in performance. It is therefore important to examine the distance between the cooling side pipe 5 and the heating side pipe 5 and a change in temperature depending on it.

Figure 11A:
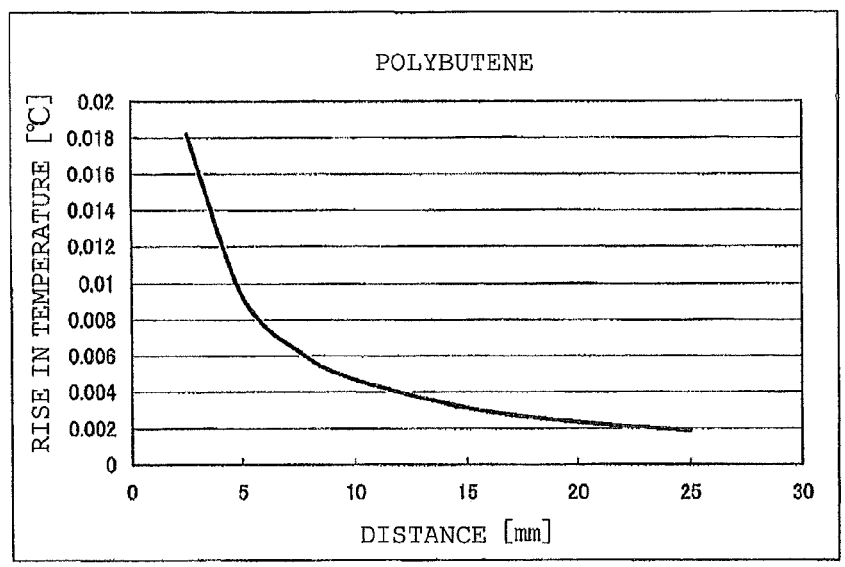
FIG. 11a is a graph illustrating the relationship between a rise in temperature and the distance between pipes.

FIG. 11a is a graph illustrating the relationship between the distance between the pipes and a rise in temperature. The relationship between the distance between the cooling side pipe 5 and the heating side pipe 5 and a change of temperature depending on it will be described with reference to FIG. 11a. In FIG. 11a, the abscissa axis indicates the distance [m] between the pipes and the ordinate axis indicates a rise in temperature [° C.]. FIG. 11a illustrates the results of calculations when hot water (the temperature of the heat medium flowing through the heating side main pipe) was at 45° C., cold water (the temperature of the heat medium flowing through the cooling side main pipe) was at 10° C., a material for the pipes was polybutene, and thermal conductivity was 0.20 (W/mk). Incidentally, the diameter of each pipe was 38 [mm] and a contact distance was 1 [m].

Figure 11B:
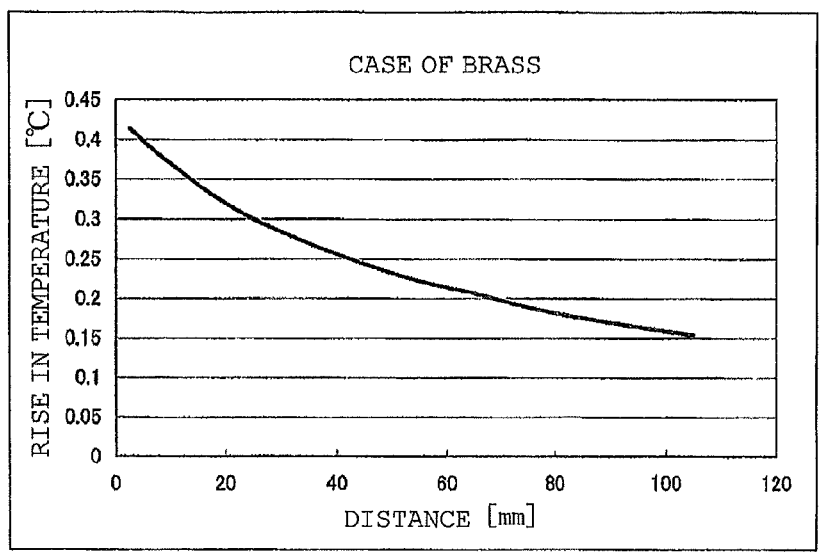
FIG. 11b is a graph illustrating the relationship between a rise in temperature and the distance between pipes.

FIG. 11a demonstrates that the change of temperature was saturated when the distance was about 15 [mm] (1.5 cm). As the result, it is found that heat interference can be suppressed so long as a distance of 15 [mm] or more is ensured as the distance between the cooling side main pipe and the heating side main pipe. Incidentally, thermal conductivity varies depending on the pipe material. Accordingly, it is preferred to examine the relationship between a rise in temperature and the distance between the pipes for each thermal conductivity. FIG. 11b illustrates the results of examinations when brass was used as a material for the body.

FIG. 11b demonstrates that in the case where the pipe material is brass, the change of temperature was saturated when the distance was about 100 mm. As the result, it is found that heat interference can be suppressed so long as a distance of 100 mm or more is ensured as the distance between the cooling side main pipe and the heating side main pipe. When a distance of 100 [mm] or more is held as the distance between the cooling side main pipe and the heating side main pipe, heat interference can be prevented but the valve block 350 becomes very large. Accordingly, the advantage of miniaturization of the valve block unit 300 is reduced. In other words, when a high thermal conductivity material, such as brass, copper, iron, or aluminum, is used as a material for the body of the valve block 350, it is necessary to thermally isolate the cooling side main pipe from the heating side main pipe.

Figure 12:
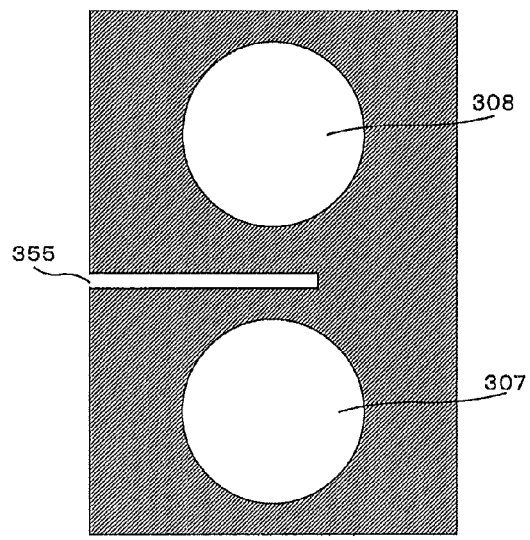
FIG. 12 is an explanatory diagram explaining another means that suppresses heat interference.

FIG. 12 is an explanatory diagram explaining another means for suppressing heat interference when it is difficult to prevent heat interference at the above-described distance. The other means for suppressing heat interference between the cooling side pipe 5 and the heating side pipe 5 will be described with reference to FIG. 12. In FIGS. 11a and 11b, the case where heat interference is suppressed by the distance between the pipes has been described as an example. FIG. 12 illustrates a case where a slit 355 is provided between the cooling side pipe 5 and the heating side pipe 5 to reduce the effect of heat conduction, thus suppressing heat interference. As illustrated in FIG. 12, the formation of the slit 355 can also suppress heat interference. Incidentally, heat interference may be suppressed both of the distance between the pipes and the slit. When metal is used as a material for the body of the valve block unit 300, water may be accumulated in the slit 355 to cause corrosion. Accordingly, the slit 355 may be filled with a material having a low thermal conductivity (for example, 1.0 [W/mK]).

Figure 11C:
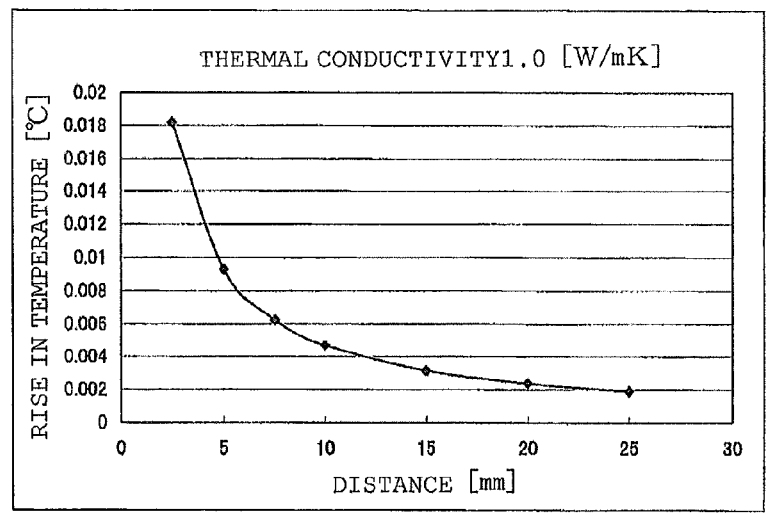
FIG. 11c is a graph illustrating the relationship between a rise in temperature and the distance between pipes.

To make the valve block unit 300 compact, an upper limit of the distance between the cooling side main pipe and the heating side main pipe is considered to be about 20 [mm]. A thermal conductivity at this time is about 1.0 [W/mK]. FIG. 11c illustrates the relationship between a rise in temperature and the distance between the cooling side main pipe and the heating side main pipe at 1.0 [W/mK]. FIG. 11c demonstrates that the change of temperature was saturated when the distance was approximately 20 [mm]. The thermal conductivity of cross-linked polyethylene is about 0.4 [W/mK]. The distance between the cooling side main pipe and the heating side main pipe necessary for saturation of the rise in temperature is about 15 mm. Further, the thermal conductivity of PPS is about 0.22 [W/mK]. When substantially the same distance (15 mm) as that in the case of polybutene is ensured, heat interference can be prevented.

Embodiment 1 has been described with respect to the case where a near-azeotropic refrigerant, such as R410A or R404A, a non-azeotropic refrigerant, such as R407C, or a refrigerant having a relatively low global warming potential, such as $CF_3CF=CH_2$ including a double bond in its chemical formula, or a mixture thereof, or a natural refrigerant, such as carbon dioxide or propane, can be used as the heat-source-side refrigerant as described above. The refrigerant is not limited to the above-described refrigerants. Further, Embodiment 1 has been described with respect to the case where the accumulator 17 is provided in the outdoor unit 1. If the accumulator 17 is not provided, similar operations are performed and similar advantages are obtained.

Further, the heat source side heat exchanger 12 and each use side heat exchanger 26 generally often include a blower, such as a fan, to accelerate condensation or evaporation by blowing, but the arrangement is not limited to this case. For example, a heat exchanger using radiation, such as a panel heater, can be used as the use side heat exchanger 26. A water-cooled heat exchanger which transfers heat using water or antifreeze solution can be used as the heat source side heat exchanger 12. Any type heat exchanger can be used so long as it is designed to allow heat dissipation or heat absorption.

The case where the heat medium flow direction switching device 22, the heat medium flow direction switching device 23, and the heat medium flow rate control device 24 are provided for each of the use side heat exchangers 26 has been described as an example. The arrangement is not limited to this case. For example, the devices 22, the devices 23, and the devices 24 can be connected to a single use side heat exchanger 26. In this case, the heat medium flow direction switching devices 22, the heat medium flow direction switching devices 23, and the heat medium flow rate control devices 24 connected to the same use side heat exchanger 26 may be similarly operated. In addition, the case where the two heat medium heat exchangers 15 are arranged has been described as an example. As a matter of course, the number is not limited. Three or more heat medium heat exchangers may be provided so long as the heat exchangers are designed to allow cooling or/and heating of the heat medium.

Further, the case where the third heat medium temperature detecting means 33 and the fourth heat medium temperature detecting means 34 are arranged in the relay unit 3 has been described. Part or all of them may be arranged in each indoor unit 2. The arrangement of them in the relay unit 3 has an advantage in that maintenance is easily made because the valves and pumps for the heat medium are collected in a single housing. On the other hand, the arrangement of them in the indoor unit 2 has an advantage in that they are easily handled because they can be handled in a manner similar to expansion valves in a related-art direct expansion indoor unit, they are not affected by heat loss in extension pipes because they are arranged near the use side heat exchanger 26, and heat load controllability in the indoor unit 2 is good. In addition, in a system including a plurality of indoor units 2 connected, even if the heat medium flow rate control device 24 in one indoor unit 2 is out of order, the heat medium regulating device 22 can be relatively easily exchanged without another indoor unit being not stopped.

As described above, since the valve block unit 300 according to Embodiment 1 includes the plurality of valve blocks 350 coupled to one another, the remarkable miniaturization can be achieved. In other words, the relay unit 3 including the valve block unit 300 can be miniaturized. Further, since the valve blocks 350 can be easily coupled to one another, the ease of assembly is increased, so that the time and effort required for installation can be reduced. Moreover, since heat interference between the pipes 5 is suppressed in the valve block unit 300, a degradation in performance can be reduced. Therefore, the use of the valve block unit 300 contributes to energy saving.

Embodiment 2

Figure 13:
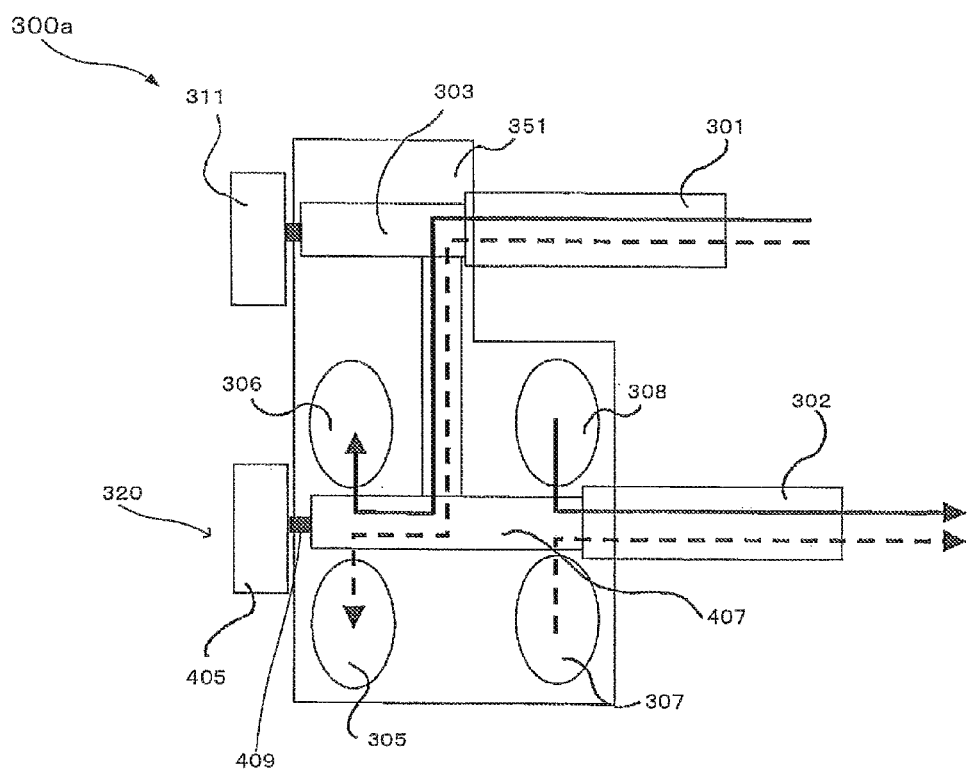
FIG. 13 is a longitudinal sectional view schematically illustrating the sectional configuration of a valve block constituting a valve block unit according to Embodiment 2.

FIG. 13 is a longitudinal sectional view schematically illustrating the sectional configuration of a valve block 351 constituting a valve block unit 300a according to Embodiment 2 of the present invention. The configuration of the valve block 351 will be described together with the flow of a heat medium with reference to FIG. 13. Incidentally, Embodiment 2 will be described mainly with respect to a difference from Embodiment 1 and the same components as those in Embodiment 1 will be designated by the same reference numerals and explanation thereof will be omitted.

In Embodiment 1, the heat medium flow direction switching device 22 and the heat medium flow direction switching device 23 switch between flow paths using different valve bodies (the valve body 304a, the valve body 304b) and different valve body rotating means (the valve body rotating means 309, the valve body rotating means 310). The operations of the heat medium flow direction switching device 22 and the heat medium flow direction switching device 23 are synchronized on the basis of their functions. Specifically, during cooling, the heat medium flow direction switching device 22 turns the valve in the cooling direction and the heat medium flow direction switching device 23 also turns the valve in the cooling direction (refer to the broken line arrows in FIG. 5). Whereas, during heating, the heat medium flow direction switching device 22 turns the valve in the heating direction and the heat medium flow direction switching device 23 also turns the valve in the heating direction (see the solid line arrows in FIG. 5).

Therefore, the heat medium flow direction switching device 22 and the heat medium flow direction switching device 23 can be operated using one valve body rotating means and one valve body. Referring to FIG. 13, the valve block 351 is designed such that the cooling outward-flow main pipe 307 and the cooling return-flow main pipe 305 are horizontally aligned and the heating outward-flow main pipe 308 and the heating return-flow main pipe 306 are horizontally aligned. Further, the valve block 351 is provided with a heat medium flow direction switching device 25 which functions in a manner similar to the heat medium flow direction switching device 22 and the heat medium flow direction switching device 23. In other words, the heat medium flow direction switching device 25 has the functions of the heat medium flow direction switching device 22 and the heat medium flow direction switching device 23.

Specifically, the heat medium flow direction switching device 25 selectively switches between the cooling outward-flow main pipe 307 and the heating outward-flow main pipe 308 and also selectively switches between the cooling return-flow main pipe 305 and the heating return-flow main pipe 306. This heat medium flow direction switching device 25 includes valve body rotating means 405, a valve body 407, and a valve rod 409 connecting them. The valve body rotating means 405 is configured to rotate the valve body 407 about the rotation axis (not illustrated). The rotation of the valve body rotating means 405 is transmitted through the valve rod 409 to the valve body 407. FIG. 13 illustrates a state in which the heat medium flow rate control device 24 is provided for the valve block 351. This heat medium flow rate control device 24 is not necessarily needed and may be provided for the first branch pipe 301.

Figure 14:
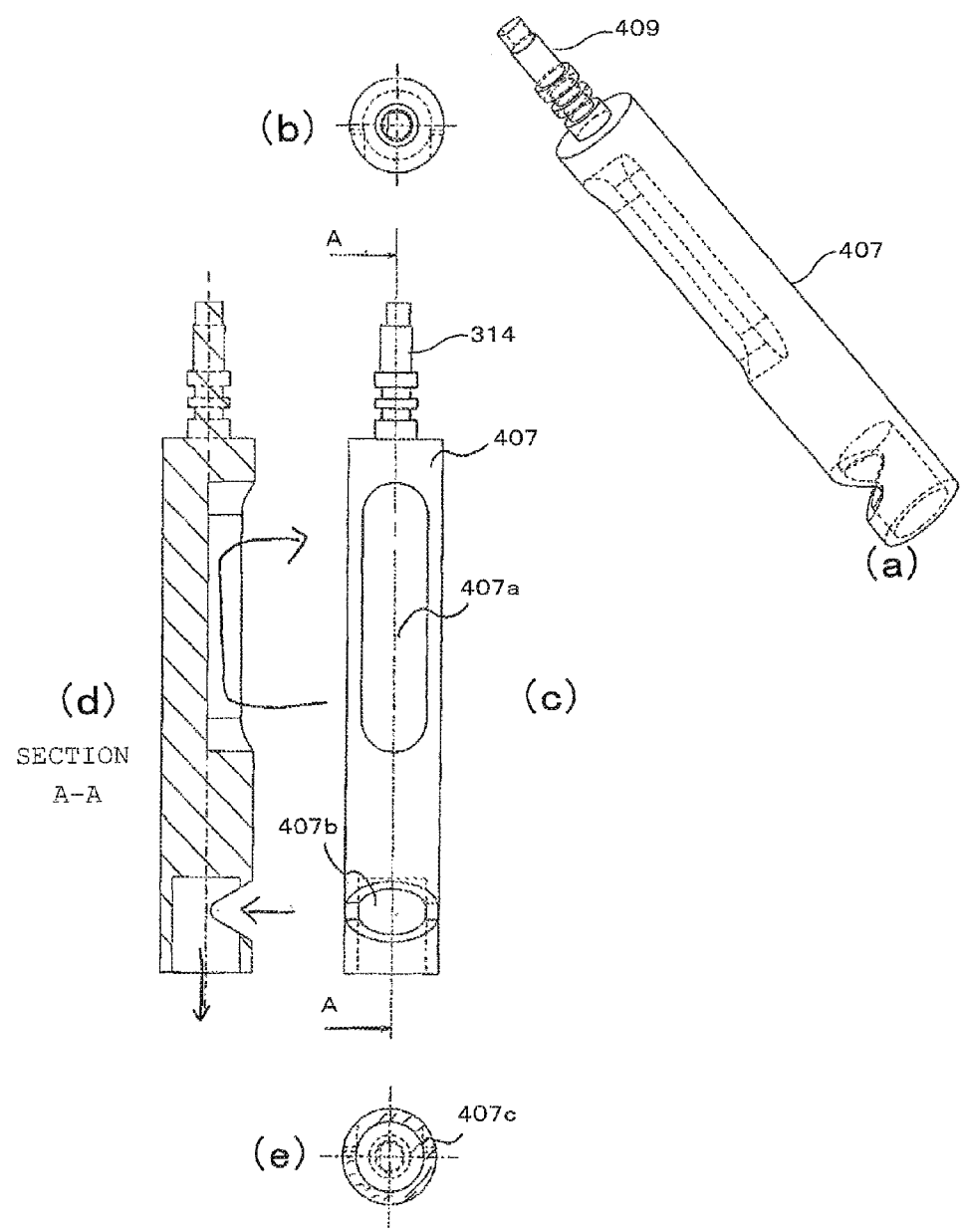
FIG. 14 is an explanatory diagram explaining a valve body.

FIG. 14 is an explanatory diagram explaining the valve body 407. The valve body 407 will be described in detail with reference to FIG. 14. FIG. 14(a) is a perspective view of the valve body 407, FIG. 14(b) is a plan view of the valve body 407, FIG. 14(c) is a front view of the valve body 407 (a side elevational view thereof when viewed from the side of an aperture formation surface). FIG. 14(d) is a sectional view of the valve body 407 taken along the line A-A, and FIG. 14(e) is a bottom view of the valve body 407. The valve rod 409 is also illustrated in FIG. 14. Note that FIG. 14 illustrates that the longitudinal direction of the valve body 407 corresponds to the up-and-down direction. Actually, the valve body 407 is disposed such that the longitudinal direction thereof corresponds to the horizontal direction as illustrated in FIG. 13.

The valve body 407 is shaped in a long cylinder. This valve body 407 has an aperture (first aperture) 407a in an elongated shape (a shape when the aperture 407a is viewed from the front) extending in the longitudinal direction of the valve body 407, an aperture (second aperture) 407b in an oval shape (a shape when the aperture 407b is viewed from the front), and an aperture (third aperture) 407c which communicates with the aperture 407b. The aperture 407c is disposed on the bottom surface of the valve body 407. The valve body 407 is hollow in order to allow the aperture 407b to communicate with the aperture 407c.

Specifically, when the aperture 407b of the valve body 407 faces downward (the lower side in the arrangement of FIG. 13), the first branch pipe 301 communicates with the cooling outward-flow main pipe 307 through the aperture 407c. While the aperture 407b faces the cooling outward-flow main pipe 307, the heat medium passes through the aperture 407b and the aperture 407c, so that the heat medium is fed to the indoor unit 2 (a broken line arrow illustrated in FIG. 13). Whereas, when the aperture 407b of the valve body 407 faces upward (the upper side in the arrangement of FIG. 13), the first branch pipe 301 communicates with the heating outward-flow main pipe 308 through the aperture 407c. While the aperture 407b faces the heating outward-flow main pipe 308, the heat medium passes through the aperture 407b and the aperture 407c, so that the heat medium is fed to the indoor unit 2 (the solid line arrow illustrated in FIG. 13).

Similarly, when the aperture 407a of the valve body 407 faces downward (the lower side in the arrangement of FIG. 13), the second branch pipe 302 communicates with the cooling return-flow main pipe 305. While the aperture 407a faces the cooling return-flow main pipe 305, the heat medium flowing from the second branch pipe 302 passes through the aperture 407a, so that the heat medium flows into the cooling return-flow main pipe 305 (a broken line arrow illustrated in FIG. 13). On the other hand, when the aperture 407a of the valve body 407 faces upward (the upper side in the arrangement of FIG. 13), the second branch pipe 302 communicates with the heating return-flow main pipe 306. While the aperture 407a faces the heating return-flow main pipe 306, the heat medium flowing from the second branch pipe 302 passes through the aperture 407a, so that the heat medium flows into the heating return-flow main pipe 306 (the solid line arrow illustrated in FIG. 13).

With this configuration, the number of valve body rotating means installed can be reduced from 2 to 1. Consequently, the cost can be reduced by the reduction. In addition, since the heat medium flow direction switching device is shared by the combinations, further miniaturization can be achieved. Moreover, since the number of valve body rotating means is reduced, the power consumption (current) can also be reduced.

Figure 15:
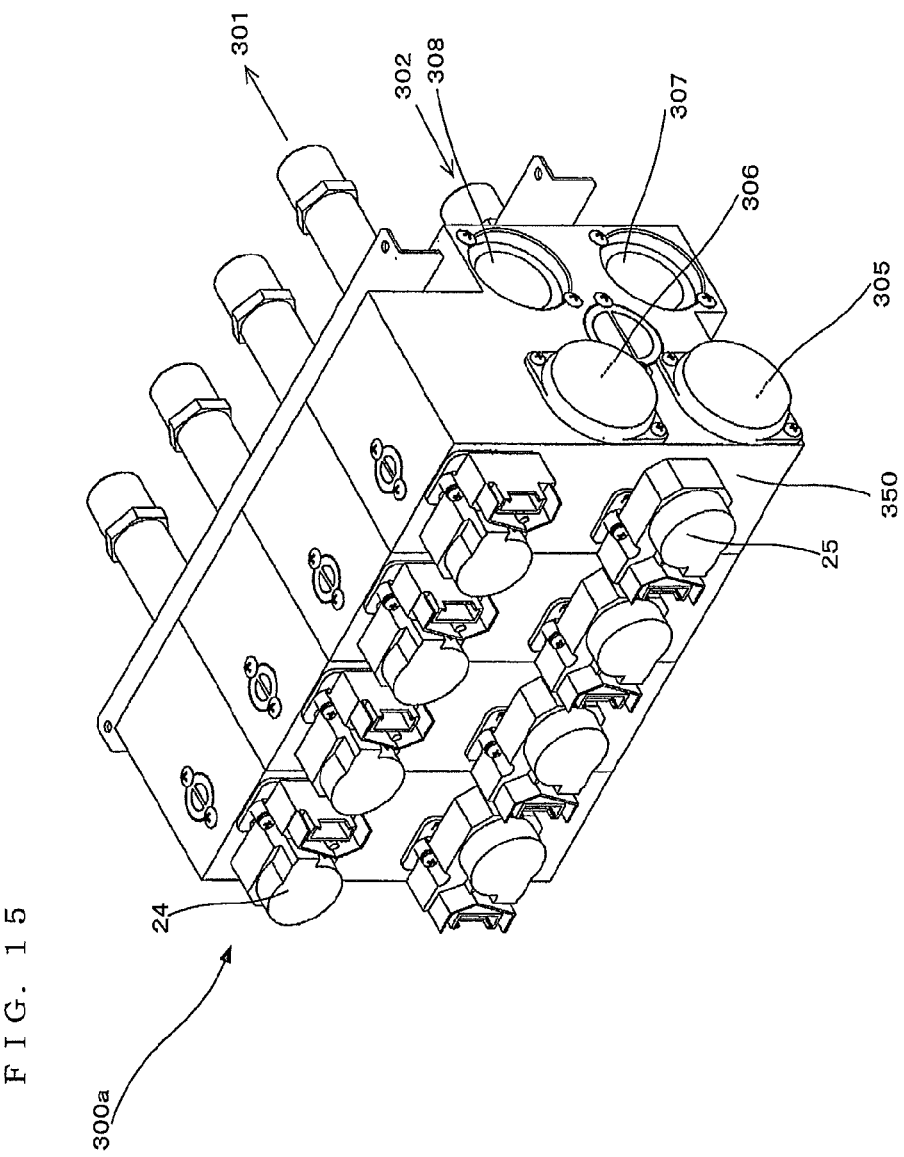
FIG. 15 is a perspective view illustrating the details of the configuration of the valve block unit.
Figure 17:
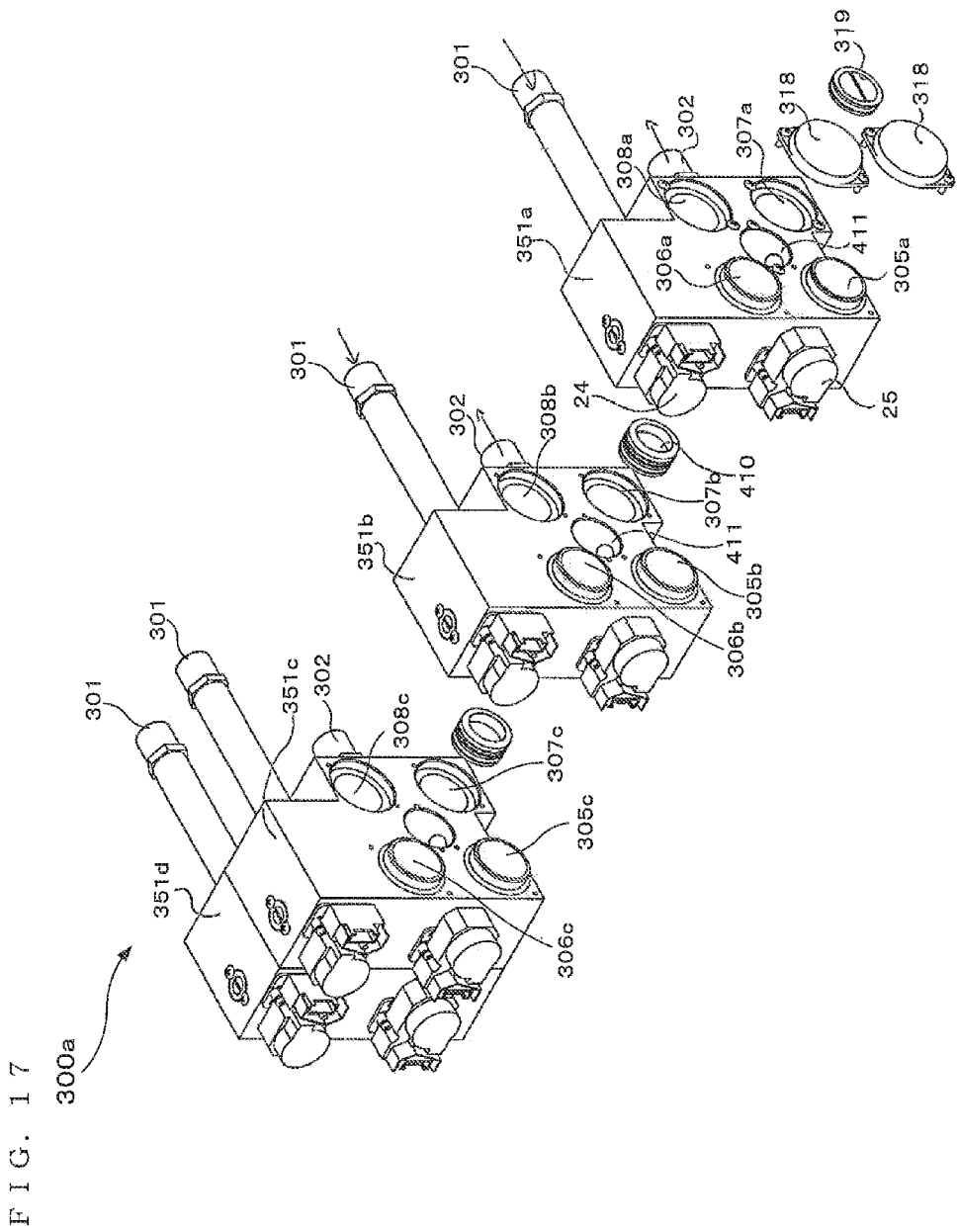
FIG. 17 is an explanatory diagram explaining coupling of the valve blocks.

FIG. 15 is a perspective view illustrating the details of the configuration of the valve block unit 300a. FIGS. 16 and 17 are explanatory diagrams for explaining coupling of the valve blocks 351. The valve blocks 351 will be described in detail with reference to FIGS. 15 to 17. FIG. 16 is a sectional view of the valve blocks 351 in a coupled state. Further, FIG. 17 is a perspective view of the valve blocks 351 while they are being coupled.

The valve block unit 300a illustrated in FIG. 15 includes four valve blocks 351 (valve block 351a to valve block 351d) in a manner similar to the valve block unit 300 according to Embodiment 1 such that the coupled valve blocks are connected to four indoor units 2. Each valve block 351 includes the heat medium flow path switching device 22, the heat medium flow direction switching device 23, and the heat medium flow rate control device 24 which cover one branch. In other words, the valve block unit 300a according to Embodiment 2 is divided into four branches.

The cooling outward-flow main pipes 307 (illustrated as the cooling outward-flow main pipe 307a, the cooling outward-flow main pipe 307b, and the cooling outward-flow main pipe 307c in that order from the right of the drawing sheet in FIG. 17) of the valve blocks 351, the heating outward-flow main pipes 308 (illustrated as the heating outward-flow main pipe 308a, the heating outward-flow main pipe 308b, and the heating outward-flow main pipe 308c in that order from the right of the drawing sheet in FIG. 17), the cooling return-flow main pipes 305 (illustrated as the cooling return-flow main pipe 305a, the cooling return-flow main pipe 305b, and the cooling return-flow main pipe 305c in that order from the right of the drawing sheet in FIG. 17), and the heating return-flow main pipes 306 (illustrated as the heating return-flow main pipe 306a, the heating return-flow main pipe 306b, and the heating return-flow main pipe 306c in that order from the right of the drawing sheet in FIG. 17) are coupled, respectively, thus constructing the main pipes (the pipes 5). It is needless to say that the valve block 351d on the left of the drawing sheet includes the main pipes.

One end of each of the main pipes (the cooling outward-flow main pipes 307, the heating outward-flow main pipes 308, the cooling return-flow main pipes 305, and the heating return-flow main pipes 306) is female-like and the other end thereof is male-like which is coupleable to the female-like end so that the valve blocks 351 can be coupled to one another. The cooling outward-flow main pipe 307a and the heating outward-flow main pipe 308a of the valve block 351a positioned on one of both ends of the valve block unit 300a are provided with caps 318 which close them. On the other hand, the cooling return-flow main pipe 305d and the heating return-flow main pipe 306d of the valve block 351d positioned on the other one of both the ends of the valve block unit 300a are provided with caps 319 which close them. The heating return-flow main pipe 306a is connected to the suction side of the heating side pump (the first heat medium delivery device 21a) and the cooling return-flow main pipe 305a is connected to the suction side of the cooling side pump (the second heat medium delivery device 21b).

With this configuration, as illustrated in FIGS. 16 and 17, the plurality of valve blocks 351 can be easily coupled to one another and the number of branches can be flexibly changed. In addition, since the valve blocks 351 can be easily coupled, the workability (productivity) of the valve block 351 is increased, so that a reduction in cost can also be achieved. Incidentally, although the cooling outward-flow main pipes 307 and the heating outward-flow main pipes 308 have been described as an example in FIGS. 16 and 17, the same applies to the cooling return-flow main pipes 305 and the heating return-flow main pipes 306.

The valve block unit 300a is designed such that switching between the heat medium flow paths can be made and a plurality of valve blocks 351 are coupled to form the main pipes. Using this valve block unit 300a, piping around the valves can be simplified as compared to a configuration in which the flow path switching devices and the pipes are separately arranged. Therefore, a unit (the relay unit 3 as in Embodiment 1) including the valve block unit 300a can be made compact.

Each hole 411 illustrated in FIG. 17 is a sacrificed hole necessary for formation of flow paths in the valve block 351 and is closed by a lid 410. If each hole 411 is not closed, the return-flow pipes of the valve blocks 351 are connected to each other. Accordingly, the hole is closed by the lid 410. The lid 410 is provided with two sealing means 410a. In this case, a case where the sealing means 410a are O-rings is illustrated. FIG. 16 demonstrates that each lid 410 is provided with the sealing means 410a to block the return-flow pipe of each valve block 351.

As described above, since the valve block unit 300a according to Embodiment 2 includes the valve blocks 351 coupled to one another, significant miniaturization can be achieved. In other words, the relay unit 3 including the valve block unit 300a can be miniaturized. Further, since the valve blocks 351 can be easily coupled, the ease of assembly is increased, so that the time and effort required for installation can be reduced. Moreover, since the valve block unit 300a suppresses heat interference between the pipes 5, a degradation in performance can be reduced. Therefore, the use of the valve block unit 300a contributes to energy saving.

To examine whether the blocks are leaking, a pressure of about 3 kgf/cm² is applied to a plurality of valve block units 300 (including the valve block unit 300a), illustrated in FIG. 15 or 4, using a gas, such as nitrogen or helium, at the same time to determine whether the sealing means 316 are leaking. Whether each valve block unit 300 is normal or abnormal is examined on the basis of the presence or absence of leakage and, after that, they are shipped. It is needless to say that the heating outward-flow main pipes 308, the cooling outward-flow main pipes 307, the first branch pipes 301, and the second branch pipes 302 in FIG. 15 and the cooling return-flow main pipes 305 and the heating return-flow main pipes 306 in FIG. 4 are covered with lids so that they can be pressurized.

As described above, the leakage test can be performed on a plurality of valve block units 300 at the same time, test time can be reduced, and the efficiency of production can be increased. Further, the test is performed while the number of branches actually used in a product is held, the quality can be stabilized and production time can also be reduced, thus resulting in a reduction in cost. If the leakage test is performed for each branch, the leakage test has to be performed after the assembly of a plurality of valve block units 300. Accordingly, the leakage test is performed twice, thus causing waste.

REFERENCE SIGNS LIST 1 outdoor unit; 2 indoor unit; 2a indoor unit; 2b indoor unit; 2c indoor unit; 2d indoor unit; 3 relay unit; 4 refrigerant pipe; 4a connecting pipe; 4b connecting pipe; 5 pipe; 5a pipe; 5b pipe; 10 compressor; 11 four-way valve; 12 heat source side heat exchanger; 13a check valve; 13b check valve; 13c check valve; 13d check valve; 14 liquid separator; 15 heat medium heat exchanger; 15a first heat medium heat exchanger; 15b second heat medium heat exchanger; 16 expansion device; 16a expansion device; 16b expansion device; 16c expansion device; 16d expansion device; 16e expansion device; 17 accumulator; 21 heat medium delivery device; 21a first heat medium delivery device; 21b second heat medium delivery device; 22 heat medium flow direction switching device; 22a heat medium flow direction switching device; 22b heat medium flow direction switching device; 22c heat medium flow direction switching device; 22d heat medium flow direction switching device; 23 heat medium flow direction witching device; 23a heat medium flow direction switching device; 23b heat medium flow direction switching device; 23c heat medium flow direction switching device; 23d heat medium flow direction switching device; 24 heat medium flow rate control device; 24a heat medium flow rate control device; 24b heat medium flow rate control device; 24c heat medium flow rate control device; 24d heat medium flow rate control device; 25 heat medium flow direction switching device; 26 use side heat exchanger; 26a use side heat exchanger; 26b use side heat exchanger; 26c use side heat exchanger; 26d use side heat exchanger; 31 first heat medium temperature detecting means; 31a first heat medium temperature detecting means; 31b first heat medium temperature detecting means; 32 second heat medium temperature detecting means; 32a second heat medium temperature detecting means; 32b second heat medium temperature detecting means; 33 third heat medium temperature detecting means; 33a third heat medium temperature detecting means; 33b third heat medium temperature detecting means; 33c third heat medium temperature detecting means; 33d third heat medium temperature detecting means; 34 fourth heat medium temperature detecting means; 34a fourth heat medium temperature detecting means; 34b fourth heat medium temperature detecting means; 34c fourth heat medium temperature detecting means; 34d fourth heat medium temperature detecting means; 35 first refrigerant temperature detecting means; 36 refrigerant pressure detecting means; 37 second refrigerant temperature detecting means; 38 third refrigerant temperature detecting means; 100 air conditioning apparatus; 300 valve block unit; 300*a* valve block unit; 301 first branch pipe; 302 second branch pipe; 303 valve body; 303*a* aperture; 303*b* flow path; 304 valve body; 304*a* valve body; 304*aa* aperture; 304*ab* flow path; 304*b* valve body; 305 cooling return-flow main pipe; 305*a* cooling return-flow main pipe; 305*b* cooling return-flow main pipe; 305*c* cooling return-flow main pipe; 305*d* cooling return-flow main pipe; 306 heating return-flow main pipe; 306*a* heating return-flow main pipe; 306*b* heating return-flow main pipe; 306*c* heating return-flow main pipe; 306*d* heating return-flow main pipe; 307 cooling outward-flow main pipe; 307*a* cooling outward-flow main pipe; 307*b* cooling outward-flow main pipe; 307*c* cooling outward-flow main pipe; 307*d* cooling outward-flow main pipe; 308 heating return-flow main pipe; 308*a* heating return-flow main pipe; 308*b* heating return-flow main pipe; 308*c* heating return-flow main pipe; 308*d* heating return-flow main pipe; 309 valve body rotating means; 310 valve body rotating means; 311 valve body rotating means; 312 valve rod; 313 valve rod; 314 valve rod; 316 sealing means; 318 cap; 319 cap; 320 coupling means; 321 sacrificed hole; 350 valve block; 350*a* valve block; 350*b* valve block; 350*c* valve block; 350*d* valve block; 351 valve block; 351*a* valve block; 351*b* valve block; 351*c* valve block; 351*d* valve block; 355 slit; 405 valve body rotating means; 407 valve body; 407*a* aperture; 407*b* aperture; 407*c* aperture; 409 valve rod; 410 lid; 410*a* sealing means; 411 hole; and 500 coupling plate.

The invention claimed is:

1. A valve block comprising:
   at least one flow switching valve including a valve body that selectively switches between conductions of a fluid;
   a flow rate control valve for adjusting a flow rate of the fluid;
   a first pipe for fluid inlet and a second pipe for fluid inlet, switched by the flow switching valve, allowing the fluid to be conveyed therethrough;
   a third pipe for fluid outlet that selectively communicates with the first pipe or the second pipe; and
   a temperature detecting device embedded in the third pipe for detecting a temperature of a heat medium,
   the flow switching valve, the flow rate control valve, the first pipe, the second pipe, and the third pipe are arranged as part of the valve block.

2. The valve block of claim 1, wherein one end of each of the first pipe and the second pipe is female-like and the other end thereof is male-like which is coupleable to another female-like end.

3. The valve block of claim 1, wherein the distance between the first pipe and the second pipe is 15 mm or longer.

4. The valve block of claim 1, wherein the flow switching valve, the first pipe, the second pipe, and the third pipe are each formed of, as a main material, a material having a thermal conductivity of 1.0 W/mk or lower.

5. The valve block of claim 1, wherein the flow switching valve, the first pipe, the second pipe, and the third pipe are each formed of a plastic material as a main material.

6. The valve block of claim 5, wherein the plastic material is PPE, PPS, cross-linked polyethylene, or polybutene.

7. A valve block unit comprising:
   a plurality of the valve blocks of claim 1, wherein the first pipes and the second pipes of the valve blocks are coupled together, respectively.

* * * * *